United States Patent
Chen et al.

(10) Patent No.: US 11,663,850 B2
(45) Date of Patent: *May 30, 2023

(54) METHOD AND SYSTEM TO PREVENT IDENTITY THEFT FOR FINGERPRINT RECOGNITION ENABLED TOUCH SCREEN DEVICES

(71) Applicant: QEEXO, CO., Mountain View, CA (US)

(72) Inventors: Yanfei Chen, Pittsburg, PA (US); Hasan. M. Masoud Smeir, Pittsburg, PA (US); Rajen Bhatt, McDonald, PA (US); Christopher Harrison, Pittsburgh, PA (US); Sang Won Lee, San Carlos, CA (US)

(73) Assignee: Qeexo, Co., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/456,419

(22) Filed: Nov. 24, 2021

(65) Prior Publication Data

US 2022/0083761 A1 Mar. 17, 2022

Related U.S. Application Data

(63) Continuation of application No. 16/408,347, filed on May 9, 2019, now Pat. No. 11,216,638.

(51) Int. Cl.
| | |
|---|---|
| *G06V 40/13* | (2022.01) |
| *G06V 40/12* | (2022.01) |
| *G06N 20/00* | (2019.01) |
| *G06F 21/32* | (2013.01) |

(52) U.S. Cl.
CPC .......... *G06V 40/1365* (2022.01); *G06F 21/32* (2013.01); *G06N 20/00* (2019.01); *G06V 40/1382* (2022.01)

(58) Field of Classification Search
CPC .......... G06V 40/1365; G06V 40/1382; G06N 20/00; G06F 21/32
See application file for complete search history.

(56) References Cited

U.S. PATENT DOCUMENTS

| | | | |
|---|---|---|---|
| 11,216,638 B2 * | 1/2022 | Chen | .......... G06F 21/32 |
| 2002/0054695 A1 | 5/2002 | Bjorn | |
| 2002/0131624 A1 | 9/2002 | Shapiro | |
| 2008/0122577 A1 | 5/2008 | Gutta | |
| 2016/0070968 A1 | 3/2016 | Gu | |
| 2019/0188364 A1 | 6/2019 | Wang | |
| 2020/0026830 A1 | 1/2020 | Alameh | |

OTHER PUBLICATIONS

International Search Report and Written Opinion for App. No. PCT/US2020/041221, dated Aug. 19, 2020, 10 pages.
Office Action (Notice of Allowance and Fees Due (PTOL-85)) dated Aug. 25, 2021 for U.S. Appl. No. 16/408,347 (pp. 1-6).
Office Action dated Apr. 16, 2021 for U.S. Appl. No. 16/408,347 (pp. 1-15).

* cited by examiner

*Primary Examiner* — Stephen G Sherman
(74) *Attorney, Agent, or Firm* — Kwan & Olynick LLP

(57) ABSTRACT

The disclosure facilitates fingerprint recognition, user authentication, and prevention of loss of control of personal information and identity theft. The disclosure also facilitates identifying spoofed fingerprint authentication attempts, and/ or securing user touch sensitive devices against spoofed fingerprint authentication attempts.

23 Claims, 13 Drawing Sheets

METHOD AND SYSTEM TO PREVENT IDENTITY THEFT FOR FINGERPRINT RECOGNITION ENABLED TOUCH SCREEN DEVICES

CROSS-REFERENCE TO RELATED APPLICATIONS

This application is a continuation and claims priority to U.S. patent application Ser. No. 16/408,347, filed on 9 May 2019, titled "Inspection of Reticles Using Machine Learning" by Yanfei Chen et al., which is incorporated herein by reference in its entirety for all purposes.

TECHNICAL FIELD

The subject disclosure is directed to identity theft prevention and, more specifically, relates to identity theft prevention for fingerprint recognition enabled touch screen devices.

BACKGROUND

Identity theft affects tens of millions of victims and results in tens of billions of dollars lost. Various identity theft protection services have arisen that attempt to mitigate the losses associated with identity theft, targeted to bank or credit fraud, employment or tax-related fraud. However, these solutions address the effects of identity theft, not the sources or causes, which at the inception, is based on a loss of control of personal information.

As efforts to address the problems of loss of control of user personal information turn to increasingly complex user authentication schemes, which define a challenge mechanism required to authenticate a user to a device, system, or service, user authentication schemes employing biometrics (e.g., facial recognition, fingerprint recognition, etc.) have been increasingly employed. Concurrently, as mobile devices computing has overtaken desktop computing, and as the costs of memory and data storage decreases, more users are spending more of their entire computing lives through their mobile devices, thus committing a wealth of personal information to their mobile devices. Accordingly, the risks associated with loss of control of user personal information and identity theft has never been more prominent.

For example, fingerprint recognition is employed in a number of user authentication schemes as a result of the ease of acquisition of biometric data, accepted use compared to other biometrics, and the possibility of a number of different possible sources of biometric information selectable by each user. In an aspect, fingerprint recognition can refer to automated or semi-automated authentication of a user based on a comparison of two data sources associated with a particular fingerprint, e.g., one stored by an authorized user, and one provided by the authorized user at time of user authentication prior to device, system, or service access being granted.

One user authentication scheme employing fingerprint recognition that has been employed includes touch screen fingerprint recognition. For example, touch screen display fingerprint recognition systems have been employed in touch-enabled devices, e.g., smart phones, game systems, kiosks, and so on. As described, while user authentication schemes employing fingerprint recognition can be convenient from the user's perspective, such schemes can pose the risk of identity theft. For instance, if user A locks a touch device with a unique fingerprint, a user B with malicious intent may be able to access the touch device using a fingerprint of user A obtained by some method, e.g., such as by printing user A fingerprints on a piece of paper. If user B fingerprint circumvents the fingerprint recognition user authentication scheme, the touch device enabled by the fingerprint of user A, the device can be unlocked, providing virtually limitless access to the user personal information of user A. It can be understood that the risk of such loss of control of user personal information and identity theft can be much higher when the entire screen is fingerprint sensing capable as malicious user has the liberty to tap anywhere on the screen.

Thus, while conventional fingerprint recognition processes for control of user personal information and/or solutions for the prevention of unauthorized access, misuse, and/or identity theft may provide some measure of security, such efforts may fail to provide meaningful solutions for adequate user control and/or security of user information, among other deficiencies. The above-described deficiencies of processes for control of user personal information and/or solutions for the prevention of unauthorized access, misuse, and/or identity theft are merely intended to provide an overview of some of the problems of conventional systems and methods, and are not intended to be exhaustive. Other problems with conventional systems and corresponding benefits of the various non-limiting embodiments described herein may become further apparent upon review of the following description.

SUMMARY

The following presents a simplified summary of the specification to provide a basic understanding of some aspects of the specification. This summary is not an extensive overview of the specification. It is intended to neither identify key or critical elements of the specification nor delineate any scope particular to any embodiments of the specification, or any scope of the claims. Its sole purpose is to present some concepts of the specification in a simplified form as a prelude to the more detailed description that is presented later.

Thus, in non-limiting embodiments, the disclosed subject matter relates to fingerprint recognition, user authentication processes. The disclosed subject matter facilitates fingerprint recognition, user authentication, and prevention of loss of control of personal information and identity theft. The disclosed subject matter also facilitates identifying spoofed fingerprint authentication attempts, and/or securing user touch sensitive devices against spoofed fingerprint authentication attempts.

In exemplary embodiments, the disclosed subject matter can employ capacitive and other sensors (e.g., sensors as embedded in smart phone, etc.) to prevent the identity theft. In a non-limiting aspect, one or more machine learning models built on the sensor data streams can be employed to distinguish between the possibility that an analyzed touch event constitutes a fingerprint (e.g., a real fingerprint, a fingerprint generated by human skin in direct contact with a touch screen) and the possibility that the analyzed touch event constitutes a spoofed fingerprint attempt (e.g., a faked fingerprint, touch surface data associated with a touch sensitive surface has the characteristics of being generated by paper or another image surface in between human skin and touch screen, which prevents direct contact of human skin with a touch screen, other spoofed fingerprint data or objects, etc.). In other non-limiting aspects, for a touch event generated by the latter case on a touch sensitive device, various embodiments can classify the touch event to be an unauthorized fingerprint comprising touch surface data associated with a spoofed fingerprint attempt, classify the touch event as an identity theft, and further actions can be performed as further described herein.

To the foregoing and related ends, systems, devices, and methods are disclosed that can facilitate fingerprint recognition, user authentication processes. According to further non-limiting implementations, the disclosed subject matter can comprise analyzing characteristics of touch surface data associated with a touch sensitive surface, determining a classification of a touch event for an object with respect to the touch sensitive surface as a fingerprint, and determining whether to reject the fingerprint or process the fingerprint based on the classification, based on whether the fingerprint is an authorized fingerprint or an unauthorized fingerprint comprising touch surface data associated with a spoofed fingerprint attempt. According to still further non-limiting implementations, the disclosed subject matter can comprise authenticating the user for an authorized and rejecting the fingerprint if it is an unauthorized fingerprint comprising touch surface data associated with a spoofed fingerprint attempt, as further detailed herein.

These and other features of the disclosed subject matter are described in more detail below.

BRIEF DESCRIPTION OF THE DRAWINGS

The devices, components, systems, and methods of the disclosed subject matter are further described with reference to the accompanying drawings in which.

DETAILED DESCRIPTION OF ILLUSTRATIVE EMBODIMENTS

Figure 1:
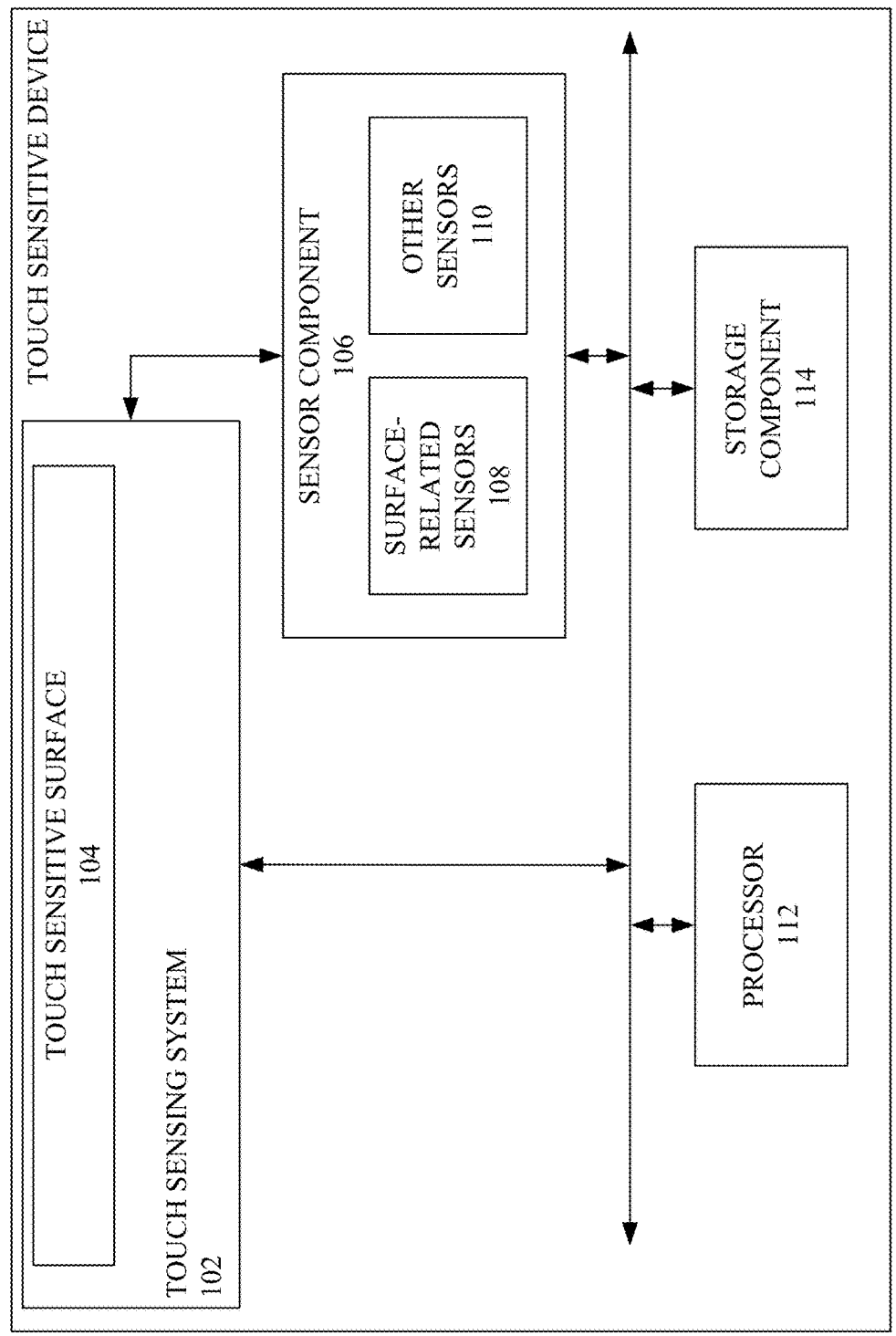
FIG. 1 depicts a functional block diagram illustrating an exemplary environment suitable for use with aspects of the disclosed subject matter.

As described above, fingerprint recognition processes for control of user personal information and/or solutions for the prevention of unauthorized access, misuse, and/or identity theft may provide some measure of security, such efforts may fail to provide meaningful solutions for adequate user control and/or security of user information, among other deficiencies.

As efforts to address the problems of loss of control of user personal information turn to increasingly complex user authentication schemes, which define a challenge mechanism required to authenticate a user to a device, system, or service, user authentication schemes employing biometrics (e.g., facial recognition, fingerprint recognition, etc.) have been increasingly employed. As described, while user authentication schemes employing fingerprint recognition can be convenient from the user's perspective, such schemes can pose the risk of identity theft. For instance, if user A locks a touch device with a unique fingerprint, a user B with malicious intent may be able to access the touch device using a fingerprint of user A obtained by some method, e.g., such as by printing user A fingerprints on a piece of paper. If user B fingerprint circumvents the fingerprint recognition user authentication scheme, the touch device enabled by the fingerprint of user A, the device can be unlocked, providing virtually limitless access to the user personal information of user A.

It can be understood that the risk of such loss of control of user personal information and identity theft can be much higher when the entire screen is fingerprint sensing capable as malicious user has the liberty to tap anywhere on the screen.

As described herein, in exemplary embodiments, the disclosed subject matter can employ capacitive and other sensors (e.g., sensors as embedded in smart phone, etc.) to prevent the identity theft. In a non-limiting aspect, one or more machine learning models built on the sensor data streams can be employed to distinguish between the possibility that an analyzed touch event constitutes a fingerprint (e.g., a real fingerprint, a fingerprint generated by human skin in direct contact with a touch screen) and the possibility that the analyzed touch event constitutes a spoofed fingerprint attempt (e.g., a faked fingerprint, touch surface data associated with a touch sensitive surface has the characteristics of being generated by paper or another image surface in between human skin and touch screen, which prevents direct contact of human skin with a touch screen, other spoofed fingerprint data or objects, etc.). In other non-limiting aspects, for a touch event generated by the latter case on a touch sensitive device, various embodiments can classify the touch event to be an unauthorized fingerprint comprising touch surface data associated with a spoofed fingerprint attempt, reject the fingerprint, lock the device, classify the touch event as an identity theft, and further actions can be performed as further described herein.

FIG. 1 depicts a functional block diagram illustrating an exemplary environment suitable for use with aspects of the disclosed subject matter. For instance, FIG. 1 illustrates a block diagram of an example touch sensitive device 100 that can determine a classification of a touch event with regard to an object in contact or proximate contact with a touch sensitive surface of the touch sensitive device, in accordance with various aspects and embodiments of the disclosed subject matter. The touch sensitive device 100 can be or can comprise, for example, a mobile phone (e.g., a cellular phone and/or smart phone), a computer, a display table, a personal digital assistant (PDA), an electronic tablet or notebook (e.g., a touch sensitive graphic tablet or notebook), a web pad, electronic bodywear (e.g., a smart watch or other electronic bodywear that comprises a touch sensitive surface), an electronic gaming device, an electronic workstation, a television, an Internet protocol (IP) television, a set-top box, a device (e.g., touch sensitive device) in or integrated with a vehicle, a touch pad, a track pad, or other type of device.

The touch sensitive device 100 can comprise a touch sensing system 102 that can comprise or be associated with a touch sensitive surface 104 that can sense when an object(s) (e.g., finger(s) of a user, palm of the user, other body part of the user, or stylus) has been brought into contact with the touch sensitive surface 104 or is in proximity to (e.g., is hovering over and/or in proximity to) the touch sensitive surface 104. The touch sensitive surface 104 can have a size and shape that can be coextensive with or can correspond to, or at least can be substantially coextensive with or can substantially correspond to, the size and shape of a presentation area of a display screen of the touch sensitive device 100.

The touch sensitive device 100 also can comprise a sensor component 106 that can comprise a set of sensors, wherein respective sensors of the set of sensors can sense respective conditions (e.g., contact or hover conditions, pressure conditions, motion conditions associated with the device 100, etc.) of or associated with the touch sensitive device 100. The set of sensors of the sensor component 106 can comprise surface-related sensors 108 that can be part of or associated with the touch sensing system 102 and the touch sensitive surface 104. The surface-related sensors 108 can be configured to sense when an object(s) is in contact with the touch sensitive surface 104 or is in proximity to (e.g., is hovering over and/or in proximity to) the touch sensitive surface 104 and generate sensor data, such as touch surface data (e.g., touch surface or touch screen data, touch surface data associated with a touch sensitive surface, etc.), relating to contact with or proximity to the touch sensitive surface 104 by the object(s), as more fully described herein. The sensor data can be employed to facilitate determining a classification (e.g., touch event classification) relating to a contact or an association (e.g., hover) of an object(s) with respect to the touch sensitive surface 104 and/or a contact state of the object(s) in relation to the touch sensitive surface 104, as more fully described herein.

The set of sensors of the sensor component 106 also can include other sensors 110 that can be configured to sense various conditions of or associated with the device 100. For example, the other sensors can sense or detect motion and/or orientation of the device 100 or an object in contact with or in proximity to the device 100, a distance of an object from the device 100 (e.g., a distance of an object from the touch sensitive surface 104), and/or other conditions of or associated with the device 100. The other sensors 110 can comprise, for example, a microphone, an accelerometer, a gyroscope, an ultrasonic sensor, an inertial measurement unit (IMU), a temperature sensor, a humidity sensor, and/or another desired type of sensor. The other sensor data can be employed to facilitate determining a classification (e.g., a touch event classification) relating to a contact or an association (e.g., hover) of an object(s) with respect to the touch sensitive surface 104 and/or a contact state of the object(s) in relation to the touch sensitive surface 104, as more fully described herein.

In non-limiting embodiments, touch surface data associated with a touch sensitive surface of exemplary touch sensitive surface 100 can be provided by touch sensing system 102 to facilitate fingerprint recognition, touch event classification, authorization, authentication, and so on, as further described herein. In other non-limiting embodiments, touch surface data associated with a touch sensitive surface of exemplary touch sensitive surface 100 can be provided by sensor component 106 (e.g., one or more of surface-related sensors 108, other sensors 110, and/or portions or combinations thereof, etc.) to facilitate fingerprint recognition, touch event classification, authorization, authentication, and so on, as further described herein.

In a non-limiting aspect, one or more machine learning models built on the sensor data streams (e.g., via touch sensing system 102, sensor component 106, and/or portions or combinations thereof, etc.) can be employed to distinguish between the possibility that an analyzed touch event constitutes a fingerprint (e.g., a real fingerprint, a fingerprint generated by human skin in direct contact with a touch screen) and the possibility that the analyzed touch event constitutes a spoofed fingerprint attempt (e.g., a faked fingerprint, touch surface data associated with a touch sensitive surface has the characteristics of being generated by paper or another image surface in between human skin and touch screen, which prevents direct contact of human skin with a touch screen, other spoofed fingerprint data or objects, etc.).

An exemplary touch sensitive device 100, or portions thereof, can further comprise one or more processors 112 (e.g. host processor, application processor, etc.) that can be associated with one or more system components as described herein. As a non-limiting example, computer-executable instructions associated with one or more system components can be executed via one or more processors 112. For instance, as described above, touch sensitive device 100 can facilitate analysis and classification of touch events associated with exemplary touch sensitive device 100.

For still other non-limiting implementations, exemplary touch sensitive device 100, or portions thereof, can also comprise a storage component 114 (e.g., which can comprise one or more of a local storage component, network storage component, memory, cache, etc.) that comprises a machine-readable storage medium and that can facilitate storage and/or retrieval of data and/or information associated with touch sensitive device 100. Thus, as described above, an exemplary touch sensitive device 100, or portions thereof, can comprise one or more processors 112 that can be associated with storage component 114 to facilitate storage of data and/or information, such as sensor data, touch surface data (e.g., touch surface or touch screen data, touch surface data associated with a touch sensitive surface, etc.), relating to contact with or proximity to the touch sensitive surface 104 by the object(s), and/or instructions for performing functions associated with and/or incident to the disclosed subject matter as described herein, for example, regarding FIGS. 1 and 3-13, etc.

It will be understood that storage component 114 and/or any subcomponent thereof as described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). A memory is intended to comprise, without being limited to, these and/or any other suitable types of memory, including processor registers and the like. In addition, by way of illustration and not limitation, storage component 114, can include conventional storage media as in known in the art (e.g., hard disk drive, solid state disk (SSD), etc.).

It can be understood that various techniques described herein may be implemented in connection with hardware or software or, where appropriate, with a combination of both. As used herein, the terms "device," "component," "system" and the like are likewise intended to refer to a computer-related entity, either hardware, a combination of hardware and software, software, or software in execution. For example, a "device," "component," subcomponent, "system" portions thereof, and so on, may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Figure 2:
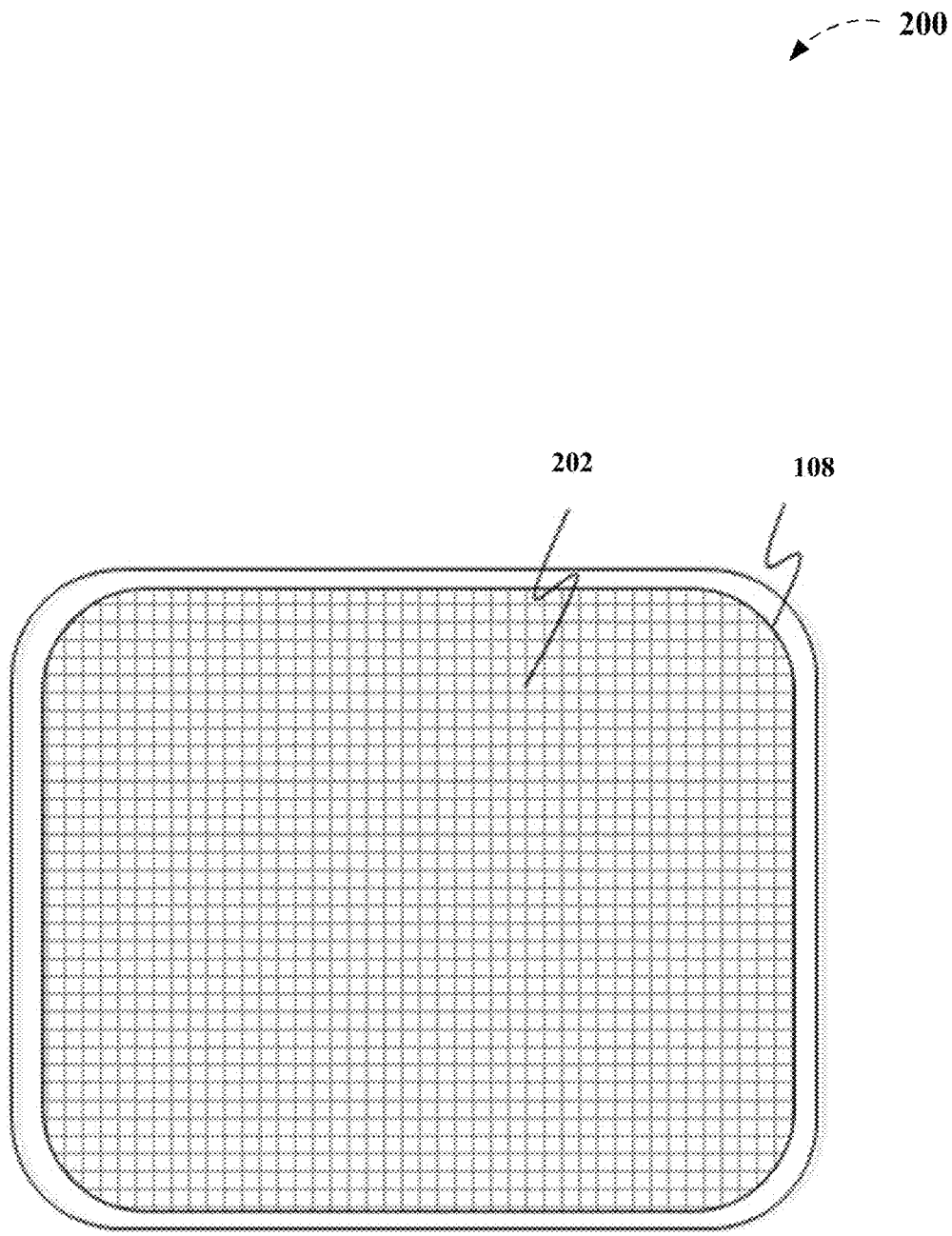
FIG. 2 depicts a diagram of a top view of the example touch sensitive device, including the touch sensitive surface, in accordance with various aspects and embodiments of the disclosed subject matter.

With further regard to the touch sensitive surface 104, referring to FIG. 2, FIG. 2 depicts a diagram of a top view 200 of the example touch sensitive device 100, including the touch sensitive surface 104, in accordance with various aspects and embodiments of the disclosed subject matter. The touch sensitive surface 104 can comprise or be associated with the surface-related sensors 108. In some embodiments, the surface-related sensors 108 can be distributed in various locations associated with the touch sensitive surface 104 to form a sensor array 202, wherein respective surface-related sensors 108 can be associated with respective portions of the touch sensitive surface 104. For example, the surface-related sensors 108 can be distributed to in various locations associated with the touch sensitive surface 104 to form a grid (e.g., an x, y grid). It is to be appreciated and understood that such a grid formation is merely one example formation that can be employed for distributing the surface-related sensors 108 of the sensor array 202 at various locations associated with the touch sensitive surface 104, and, in accordance with other embodiments of the disclosed subject matter, the surface-related sensors 108 can be distributed in other formations (e.g., uniform or non-uniform formations) with respect to the touch sensitive surface 104.

When an object(s) is brought into contact with, or is in sufficiently close proximity to, a location(s) on the touch sensitive surface 104, one or more surface-related sensors 108 of the sensor array 202 that are associated with that location on the touch sensitive surface 104 can sense such contact of the object(s) with the that location(s) on the touch sensitive surface 104 or sense such proximity of the object(s) to that location(s) on the touch sensitive surface 104. In response to the one or more surface-related sensors 108 sensing or detecting the object(s) in contact with or in proximity to that location(s) on the touch sensitive surface 104, the one or more surface-related sensors 108 can generate signals (e.g., touch surface data associated with a touch sensitive surface that is associated with touch sensitive device 100), which can facilitate analysis and determining a classification (e.g., touch event classification) relating to a contact or an association (e.g., hover) of an object(s) with respect to the touch sensitive surface 104 and/or a contact state of the object(s) in relation to the touch sensitive surface 104, as more fully described herein.

In some implementations, exemplary touch sensing system 102 and/or other associated components of touch sensitive device 100 as described herein can sweep the surface-related sensors 108 of the sensor array 202 or can otherwise poll the surface-related sensors 108 of the sensor array 202 to facilitate obtaining respective sensor data (e.g., respective touch surface data associated with a touch sensitive surface associated with exemplary touch sensitive device 100) from respective surface-related sensors 108 of the sensor array 202, to facilitate determining which portion(s) of the touch sensitive surface 104 is in contact with or in proximity to the object(s) at a given time (e.g., a given moment or period of time). For example, the touch sensing system 102 and/or other associated components of touch sensitive device 100 can sweep the surface-related sensors 108 of the sensor array 202 or can otherwise poll the surface-related sensors 108 of the sensor array 202 every ⅓₀th of a second, every ⅙₀th of a second, every ⅟₁₀₀th of a second, or at another desired rate or periodicity. Exemplary touch sensing system 102 and/or other associated components of touch sensitive device 100 can process and/or organize (e.g., arrange) the sensor data obtained from the surface-related sensors 108 of the sensor array 202 to generate frame data in the form of x, y dimensional data that can represent (e.g., correspond to) respective touch events (e.g., touch screen contacts or associations) associated with respective surface-related sensors 108 at the given time, wherein respective frame data associated with the respective surface-related sensors 108 can be or can comprise the respective sensor data of the respective surface-related sensors 108 or the respective frame data can be determined based at least in part on the respective sensor data.

Frame data can be conceptually understood as providing an image or frame image that can have higher-density portions representing areas of the touch sensitive surface 104 that are in contact with (or in proximity to) an object(s)

and other lower-density portions representing areas of the touch sensitive surface 104 that are not in contact with (or in proximity to) an object(s). With sufficient resolution, for example, respective surface-related sensors 108 of the sensor array 202 (e.g., such as in an array of capacitive touch sensors), determining which portion(s) of the touch sensitive surface 104 is in contact with or in proximity to the object(s) at a given time (e.g., a given moment or period of time) can provide adequate resolution such that touch surface data associated with a touch sensitive surface of exemplary touch sensitive device 100 can result in frame data associated with a touch event that can be recognized as a fingerprint.

Figure 3:
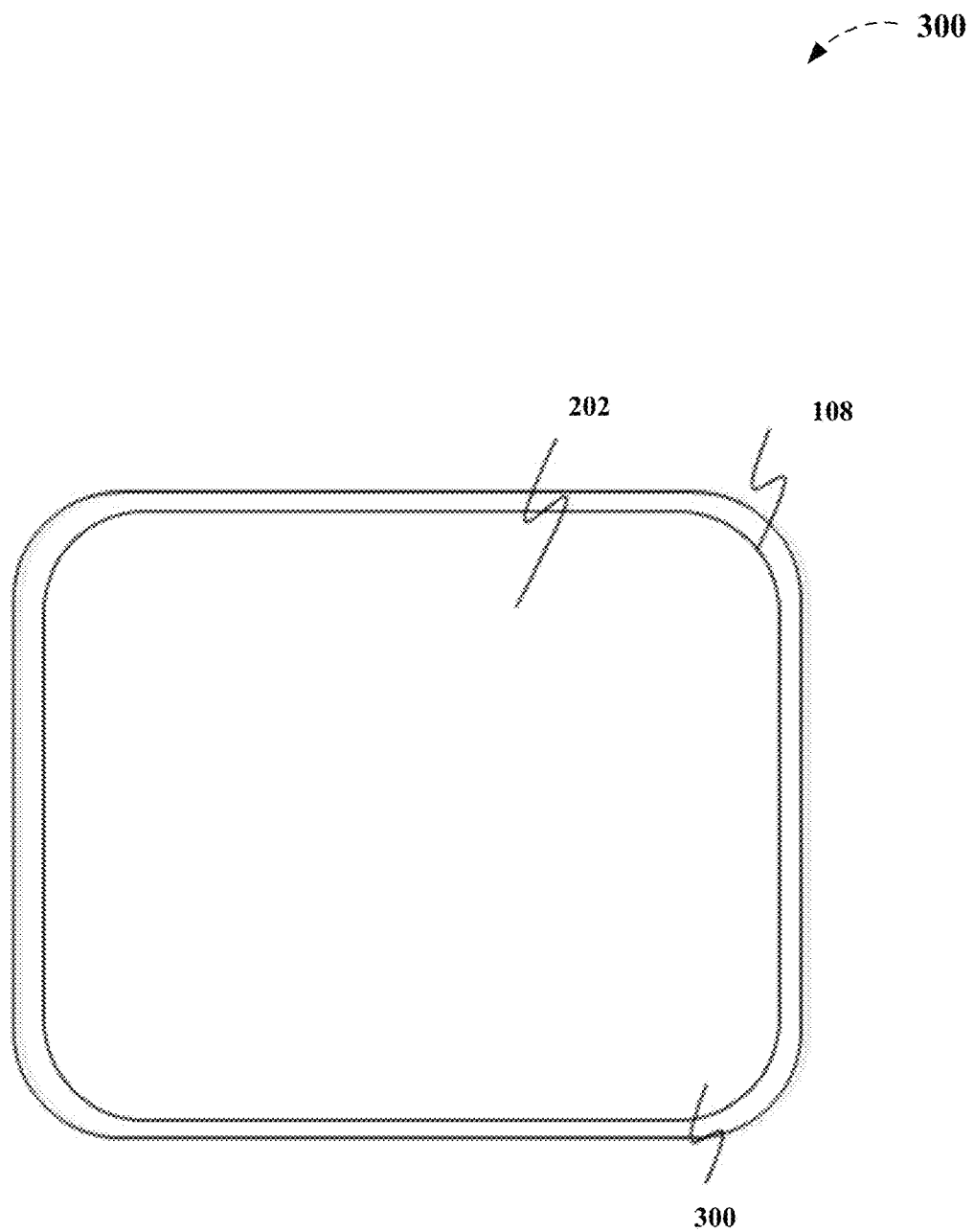
FIG. 3 presents a diagram of an example frame image as part of a visual representation of a top view of an example touch sensitive device, the frame image comprising or representing frame data associated with the touch sensitive surface, in accordance with various aspects and embodiments of the disclosed subject matter.

FIG. 3 presents a diagram of an example frame image 300 as part of a visual representation of a top view of an example touch sensitive device 100, wherein the frame image 300 comprises or represents frame data associated with the touch sensitive surface 104, in accordance with various aspects and embodiments of the disclosed subject matter. With respect to the example frame image 300, the surface-related sensors 108 of the sensor array 202 have not detected an object in contact with or in proximity to the surface-related sensors 108 and have correspondingly generated signals (e.g., touch surface data associated with a touch sensitive surface associated with exemplary touch sensitive device 100) indicating that no object has been detected in contact with or in proximity to the surface-related sensors 108. In this example frame image 300, as no objects are detected in contact with or in proximity to the touch sensitive surface 104, the frame image 300 can have the appearance illustrated in FIG. 3 with no higher-density portions (e.g., no darker colored regions) being shown in the frame image 300.

However, when objects are brought into contact with or in proximity to the touch sensitive surface 104, a portion of the surface-related sensors 108 of the sensor array 202 that are located in the portion(s) of the touch sensitive surface 104 that is in contact with or proximity to the objects can detect such objects, and can generate sensor data representing such detection in response. The portion of the surface-related sensors 108 can communicate the touch surface data associated with a touch sensitive surface associated with exemplary touch sensitive device 100 to report that the objects, (e.g., such as a fingerprint) are in contact with or proximity to the portion(s) of the touch sensitive surface 104 associated with the portion of the surface-related sensors 108, and a contrast pattern can emerge in a frame image representative of such a state of contact.

Figure 4:
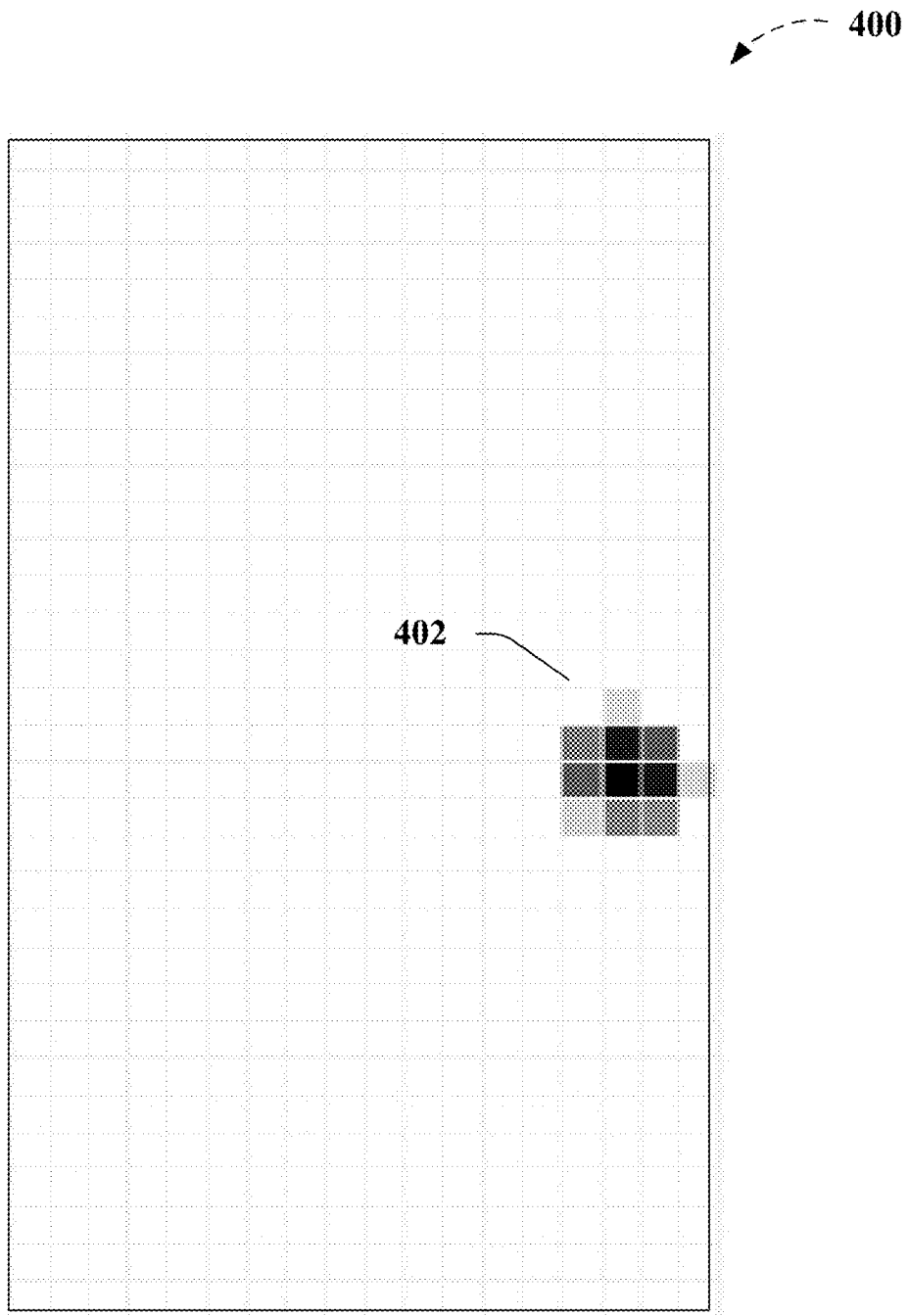
FIG. 4 presents a diagram of an example frame image that can be generated based at least in part on sensor data when certain surface-related sensors of the sensor array detect contact of a finger of the user with a portion of the touch sensitive surface, in accordance with various aspects and embodiments of the disclosed subject matter.

FIG. 4 presents a diagram of an example frame image 400 that can be generated based at least in part on sensor data (e.g., touch surface data associated with a touch sensitive surface associated with exemplary touch sensitive device 100) when certain surface-related sensors 108 of the sensor array 202 detect contact of a finger of the user with a portion of the touch sensitive surface, in accordance with various aspects and embodiments of the disclosed subject matter. For example, In FIG. 4, exemplary touch sensing system 102 and/or other associated components of touch sensitive device 100 can receive the sensor data (e.g., touch surface data associated with a touch sensitive surface associated with exemplary touch sensitive device 100) from the certain surface-related sensors 108. The touch sensitive surface 104 can comprise or be associated with a sensor array 202 that can include the surface-related sensors 108, which can comprise certain surface-related sensors 108, such as capacitive sensors, that can sense capacitance levels associated with the touch sensitive surface 104. The certain surface-related sensors 108 (and/or other sensors 110) can sense no contact, relative states of intensity of contact with the touch sensitive surface 104, and/or relative proximity of an object (e.g., finger(s) of the user) to the touch sensitive surface 104 without touching the touch sensitive surface.

However, in some implementations, the sensor array 202 of surface-related sensors 108 can be capable of detecting or determining a level of intensity of contact of an object with the touch sensitive surface 104, wherein the level of intensity of contact can relate to, for example an amount of pressure applied by an object on the touch sensitive surface 104, an intensity of a resistance experienced at the point of contact of the object with the touch sensitive surface 104, an intensity of a capacitance experienced at the point of contact of the object with the touch sensitive surface 104, and/or another type(s) of intensity relating to contact of an object with one or more surface-related sensors 108 of the sensor array 202. As a result of the sensing, the certain surface-related sensors 108 (and/or other sensors 110) can generate sensor data, such as capacitance data (e.g., mutual capacitance data), that can correspond to the respective amounts of capacitance associated with respective portions of the touch sensitive surface 104 and can indicate respective levels of contact (e.g., no contact or respective states of intensity of contact) of an object (e.g., finger(s) of the user) with the touch sensitive surface 104 or respective proximity of the object, or portion thereof, to the touch sensitive surface 104. As described above, with sufficient resolution, respective surface-related sensors 108 of the sensor array 202 (e.g., such as in an array of capacitive touch sensors), determining which portion(s) of the touch sensitive surface 104 is in contact with or in proximity to the object(s) at a given time (e.g., a given moment or period of time) can provide adequate resolution such that touch surface data associated with a touch sensitive surface of exemplary touch sensitive device 100 can result in frame data associated with a touch event that can be recognized as a fingerprint.

In some embodiments, the touch sensitive device 100 also can comprise other sensors 110 of the sensor component 106, wherein the other sensors can include, for example, a microphone, an accelerometer, a gyroscope, an ultrasonic sensor, an IMU, a temperature sensor, a humidity sensor, and/or another desired type of sensor. Exemplary touch sensing system 102 and/or other associated components of touch sensitive device 100 can receive other sensor data, such as, for example, audio from a microphone, temperature data from a temperature sensor, humidity from a humidity sensor, accelerometer data from the accelerometer, gyroscope data from the gyroscope, ultrasound data from the ultrasound component, IMU data from the IMU, and/or other types of sensor data from one or more other types of sensors. However, as described above, based on mere x, y grid or similar capacitance values obtaining frame image touch surface data associated with a touch sensitive surface associated with exemplary touch sensitive device 100, such factors alone may be insufficient to determine that the touch event is associated with an unauthorized fingerprint comprising touch surface data associated with a spoofed fingerprint attempt.

Thus, in a non-limiting aspect, one or more machine learning models built on the sensor data streams (e.g., via touch sensing system 102, sensor component 106, and/or portions or combinations thereof, etc.) can be employed to distinguish between the possibility that an analyzed touch event constitutes a fingerprint (e.g., a real fingerprint, a fingerprint generated by human skin in direct contact with a touch screen) and the possibility that the analyzed touch event constitutes a spoofed fingerprint attempt (e.g., a faked finger print, touch surface data associated with a touch sensitive surface has the characteristics of being generated by paper or another image surface in between human skin and touch screen, which prevents direct contact of human skin with a touch screen, other spoofed fingerprint data or objects, etc.).

Based on analyzing the respective sensor data (e.g., mutual capacitance data, other touch surface data associated with a touch sensitive surface associated with exemplary touch sensitive device 100, etc.) from respective surface-related sensors of the certain surface-related sensors 108 and/or the other sensor data, exemplary touch sensing system 102 and/or other associated components of touch sensitive device 100 can 112 can facilitate generating a frame image comprising one or more grayscale colored regions that can present grayscale information (e.g., corresponding to respective higher-density portions of the frame image) illustrating respective intensities of contact of an object(s) (e.g., finger(s), palm, stylus, . . . ) of or associated with the user with the respective portions of the touch sensitive surface 104 and/or respective proximities of respective portions of the object(s) to the touch sensitive surface 104.

As further described herein, exemplary touch sensing system 102 and/or other associated components of touch sensitive device 100 can facilitate determining or identifying the type of touch events with respect to the touch sensitive surface 104 and can further determine that the touch event is a fingerprint, based on analyzing the sensor data and/or other sensor data (e.g., e.g., mutual capacitance data, other touch surface data associated with a touch sensitive surface associated with exemplary touch sensitive device 100, raw sensor data, and/or other raw sensor data, etc.) and/or analyzing the frame image generated from the sensor data and/or the other sensor data (e.g., touch surface data associated with a touch sensitive surface associated with exemplary touch sensitive device 100). Based on the touch event being identified and/or classified as a fingerprint, accordingly, exemplary touch sensing system 102 and/or other associated components of touch sensitive device 100 can facilitate processing or rejecting the touch event as either an authorized or an unauthorized fingerprint, as further described herein.

Thus, FIG. 4 presents a diagram of an example frame image 400 that can be generated based at least in part on sensor data (e.g., capacitance data, such as mutual capacitance data) when certain surface-related sensors 108 (e.g., capacitive sensors) of the sensor array 202 detect contact (e.g., relative intensities of contact) of a finger of the user with a portion (e.g., a center-right portion) of the touch sensitive surface 104, in accordance with various aspects and embodiments of the disclosed subject matter to provide touch surface data associated with a touch sensitive surface 104 associated with exemplary touch sensitive device 100. The frame image 400 can represent a frame associated with the touch sensitive surface 104 at a time during which a finger of the user is in contact with a portion (e.g., a center-right portion) of the touch sensitive surface 104. The respective certain surface-related sensors 108 (and/or other sensors 110) can respectively sense no contact, relative states of intensity of contact with the touch sensitive surface 104, and/or relative proximity of an object (e.g., finger(s) of the user) to the touch sensitive surface 104 without touching the touch sensitive surface, and, accordingly, can generate sensor data (e.g., capacitance data) based at least in part on the respective sensing of the respective sensors 108. For instance, the grayscale colored region 402 can indicate that an object, which correspond to (e.g., be in the shape of) a finger (e.g., a tip, knuckle, or other portion of the finger), is in contact with the portion (e.g., a center-left portion) of the touch sensitive surface 104 that can correspond to the location of the grayscale colored region 402 depicted in the frame image 400.

Figure 5:
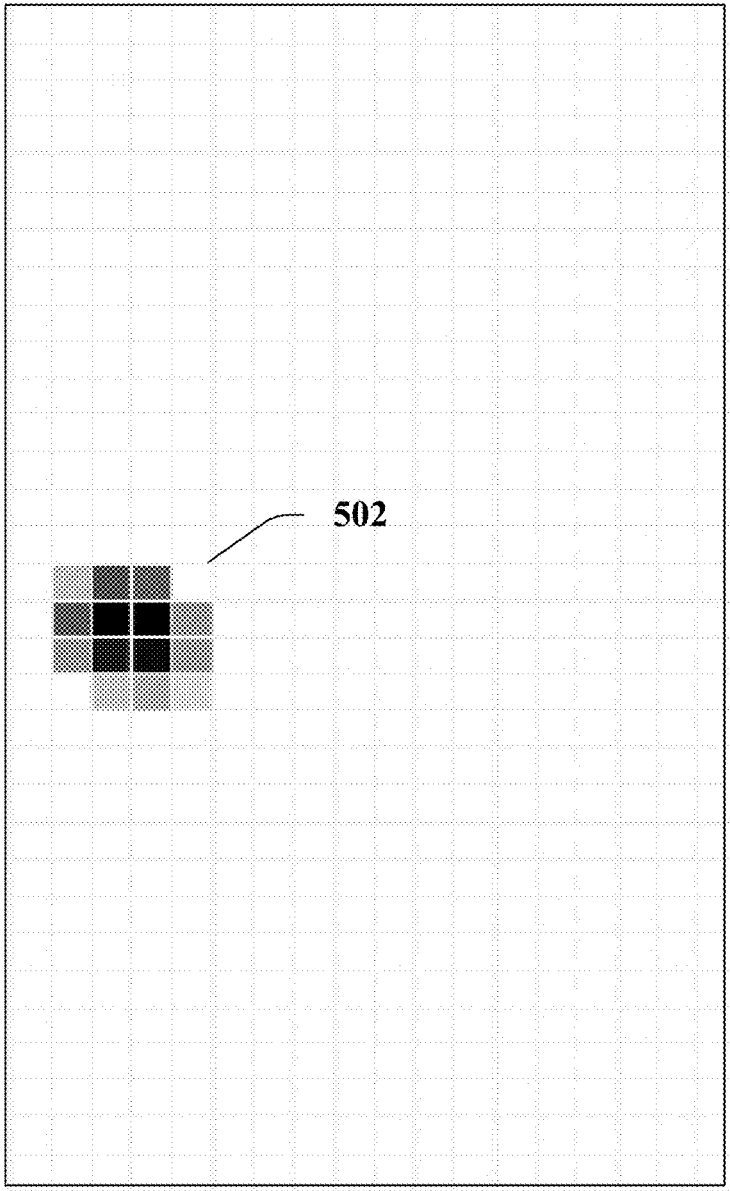
FIG. 5 illustrates a diagram of an example frame image that can be generated based at least in part on sensor data when certain surface-related sensors of the sensor array detect contact of a finger of the user with another portion of the touch sensitive surface, in accordance with various aspects and embodiments of the disclosed subject matter.

FIG. 5 illustrates a diagram of an example frame image 500 that can be generated based at least in part on sensor data (e.g., capacitance data, such as mutual capacitance data) when certain surface-related sensors 108 (e.g., capacitive sensors) of the sensor array 202 detect contact (e.g., relative intensities of contact) of a finger of the user with another portion (e.g., a center-left portion) of the touch sensitive surface 104, in accordance with various aspects and embodiments of the disclosed subject matter to provide touch surface data associated with a touch sensitive surface 104 associated with exemplary touch sensitive device 100. The frame image 500 can represent a frame associated with the touch sensitive surface 104 at a time during which a finger of the user is in contact with a portion (e.g., a center-right portion) of the touch sensitive surface 104. The respective certain surface-related sensors 108 (and/or other sensors 110) can respectively sense no contact, relative states of intensity of contact with the touch sensitive surface 104, and/or relative proximity of an object (e.g., finger(s) of the user) to the touch sensitive surface 104 without touching the touch sensitive surface, and, accordingly, can generate sensor data (e.g., capacitance data) based at least in part on the respective sensing of the respective sensors 108. Thus, as with FIG. 4, the grayscale colored region 502 of FIG. 5 can indicate that an object, which correspond to (e.g., be in the shape of) a finger (e.g., a tip, knuckle, or other portion of the finger), is in contact with the portion (e.g., a center-left portion) of the touch sensitive surface 104 that can correspond to the location of the grayscale colored region 502 depicted in the frame image 500.

FIGS. 4 and 5 demonstrate one problem associated with fingerprint recognition systems that are designed with a priority placed on user convenience over security. For instance, if user A locks touch sensitive device 100 with a unique fingerprint, a user B with malicious intent may be able to access the touch sensitive device 100 using a fingerprint of user A obtained by some method, e.g., such as by printing user A fingerprints on a piece of paper, as described herein. If user B fingerprint circumvents the fingerprint recognition user authentication scheme, the touch sensitive device 100 enabled by the fingerprint of user A, the device can be unlocked, providing virtually limitless access to the user personal information of user A. FIGS. 4 and 5 demonstrate that, by allowing user B to input touch surface data associated with a touch sensitive surface 104 associated with exemplary touch sensitive device 100 anywhere on touch sensitive surface 104, the risk of such loss of control of user personal information and identity theft can be much higher, when the entire screen is fingerprint sensing capable, as malicious user B has the liberty to input touch surface data associated with a touch sensitive surface 104 anywhere on the touch sensitive surface 104.

Figure 6:
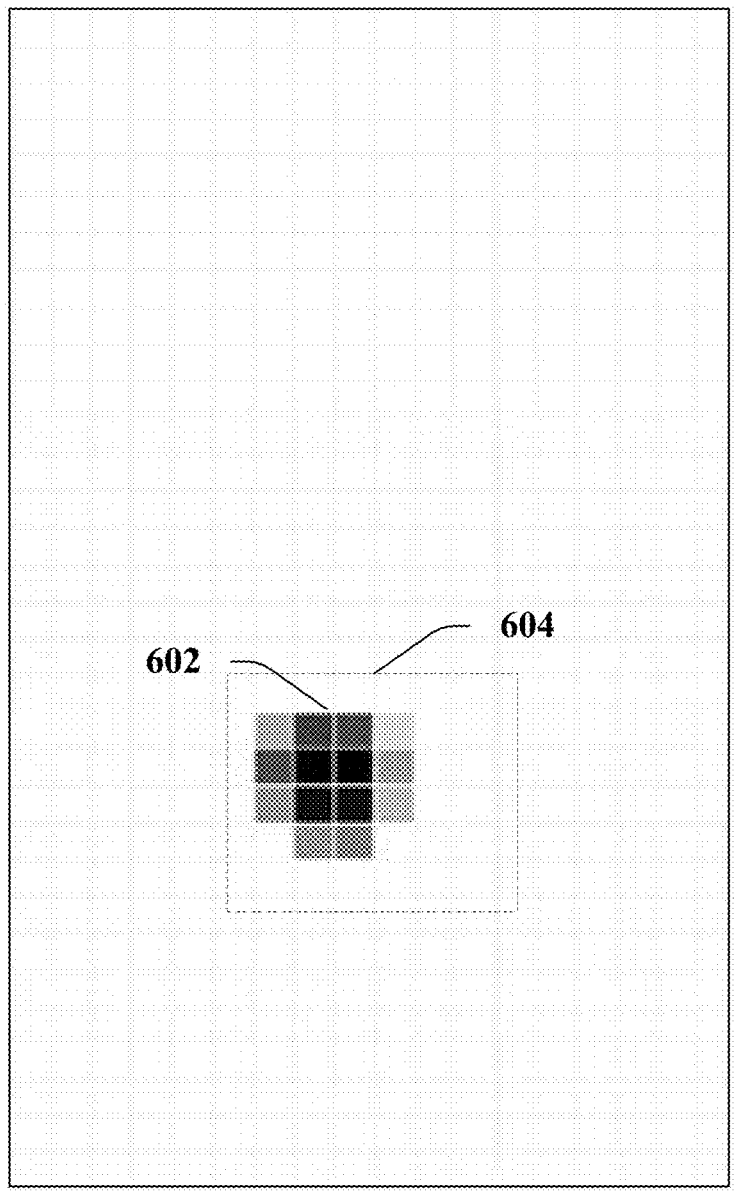
FIG. 6 illustrates a diagram of an example frame image that can be generated based at least in part on sensor data when certain surface-related sensors of the sensor array detect contact of a finger of the user with a certain predefined portion of the touch sensitive surface, in accordance with various aspects and embodiments of the disclosed subject matter.

FIG. 6 illustrates a diagram of an example frame image 600 that can be generated based at least in part on sensor data when certain surface-related sensors 108 of the sensor array 202 detect contact of a finger of the user with a certain pre-defined portion of the touch sensitive surface 104, in accordance with various aspects and embodiments of the disclosed subject matter. As with FIGS. 4 and 5, grayscale colored region 602 of FIG. 6 can indicate that an object, which correspond to (e.g., be in the shape of) a finger (e.g., a tip, knuckle, or other portion of the finger), is in contact with the portion (e.g., a certain, pre-defined portion, a center portion) of the touch sensitive surface 104 that can correspond to the location of the grayscale colored region 602 depicted in the frame image 600. However, in a non-limiting aspect, embodiments of exemplary touch sensitive devices (e.g., touch sensitive devices 100, etc.) may provide a certain pre-defined portion 604 of the touch sensitive surface 104, in which any fingerprint recognition process would be required to employ to facilitate input of touch surface data associated with a touch sensitive surface 104 of an exemplary touch sensitive device 100. However, requiring such certain predefined portions 602 to facilitate input of touch surface data associated with a touch sensitive surface 104 of an exemplary touch sensitive device 100 in a fingerprint recognition user authentication process may still offer inadequate protection against the risk of such loss of control of user personal information and identity theft, if sufficient protection is not taken against spoofed fingerprint attempts (e.g., a faked fingerprint, touch surface data associated with a touch sensitive surface has the characteristics of being generated by paper or another image surface in between human skin and touch screen, which prevents direct contact of human skin with a touch screen, other spoofed fingerprint data or objects, etc.).

Figure 7:
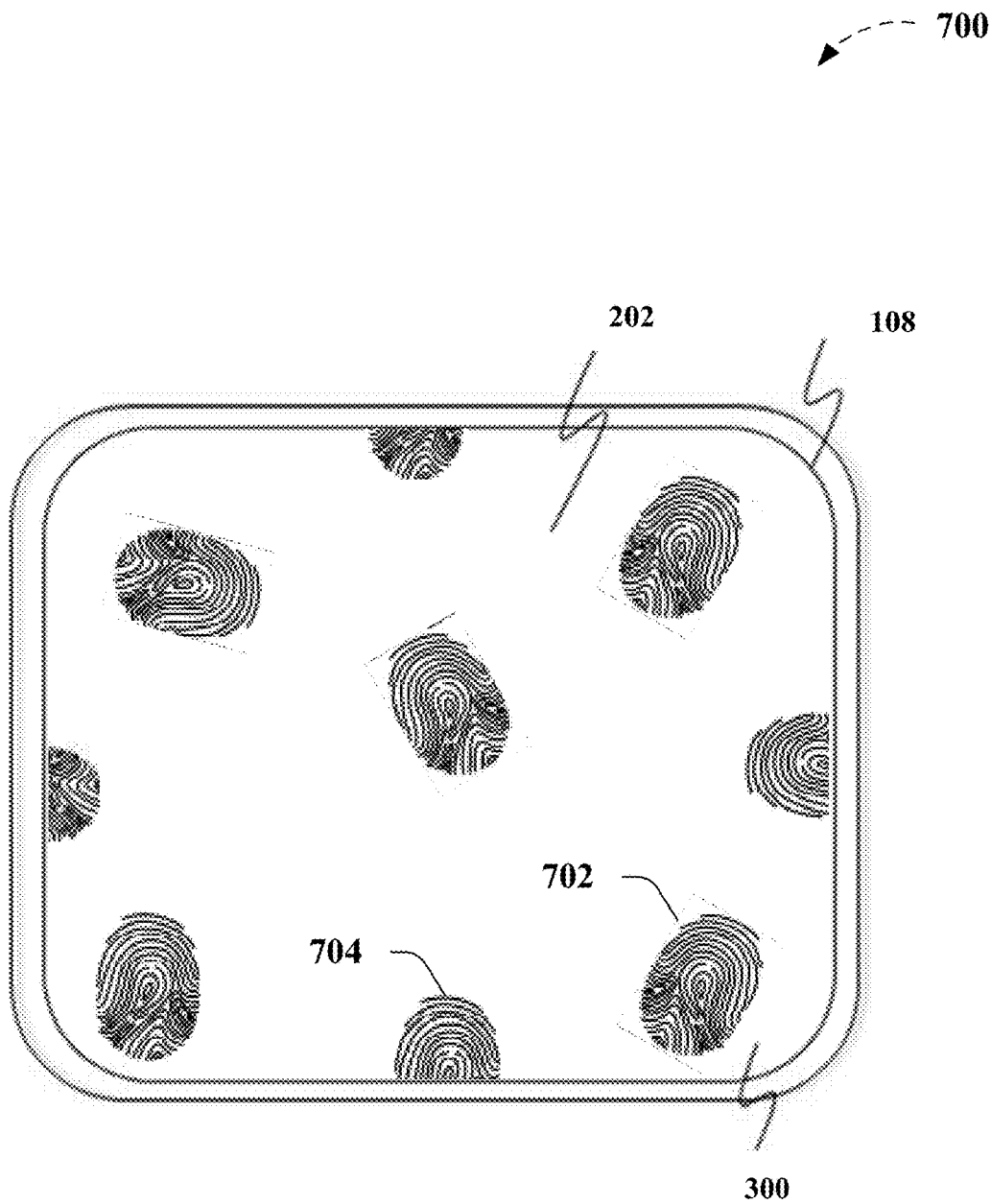
FIG. 7 depicts an example touch sensitive device with a number of user fingerprints that can be obtained from the touch sensitive device touch sensitive surface, for which a spoofed fingerprint attempt can be presented to the touch sensitive device (e.g., a faked fingerprint, an unauthorized fingerprint comprising touch surface data associated with the touch sensitive device), in accordance with various aspects and embodiments of the disclosed subject matter.

For example, FIG. 7 depicts an example touch sensitive device 100 with a number of user fingerprints 702 or partial fingerprints 704 that can be obtained from the touch sensitive device 300 touch sensitive surface 104, for which a spoofed fingerprint attempt can be presented to the touch sensitive device (e.g., a faked fingerprint, an unauthorized fingerprint comprising touch surface data associated with the touch sensitive surface has the characteristics of being generated by paper or another image surface in between human skin and touch screen, which prevents direct contact of human skin with a touch screen, other spoofed fingerprint data or objects, etc.), in accordance with various aspects and embodiments of the disclosed subject matter. Any of the user fingerprints 702, partial fingerprints 704, and/or portions thereof, can be captured and replicated by conventional means, including, but not limited to digitization, digital replication and/or manipulation, and so on. As described herein, a user B with malicious intent may be able to access the touch sensitive device 300 using a fingerprint 704 of user A obtained by some method, e.g., such as by printing user A fingerprints on a piece of paper or any other artificial finger type material on which fingerprint can be copied or 3D printed, to attempt to circumvent a fingerprint recognition user authentication scheme employed by example touch sensitive device 300, in which the touch sensitive device 300 enabled by the spoofed fingerprint attempt (e.g., a faked fingerprint, touch surface data associated with a touch sensitive surface has the characteristics of being generated by paper or another image surface in between human skin and touch screen, which prevents direct contact of human skin with a touch screen, other spoofed fingerprint data or objects, etc.), the example touch sensitive device 300 can be unlocked, providing virtually limitless access to the user personal information of user A. It can be understood that even when requiring such certain predefined portions 602 to facilitate input of touch surface data associated with a touch sensitive surface 104 of an exemplary touch sensitive device 100 in a fingerprint recognition user authentication process, the risk of such loss of control of user personal information and identity theft can remain, if sufficient protection is not taken against spoofed fingerprint attempts (e.g., a faked fingerprint, touch surface data associated with a touch sensitive surface has the characteristics of being generated by paper or another image surface in between human skin and touch screen, which prevents direct contact of human skin with a touch screen, other spoofed fingerprint data or objects, etc.).

Figure 8:
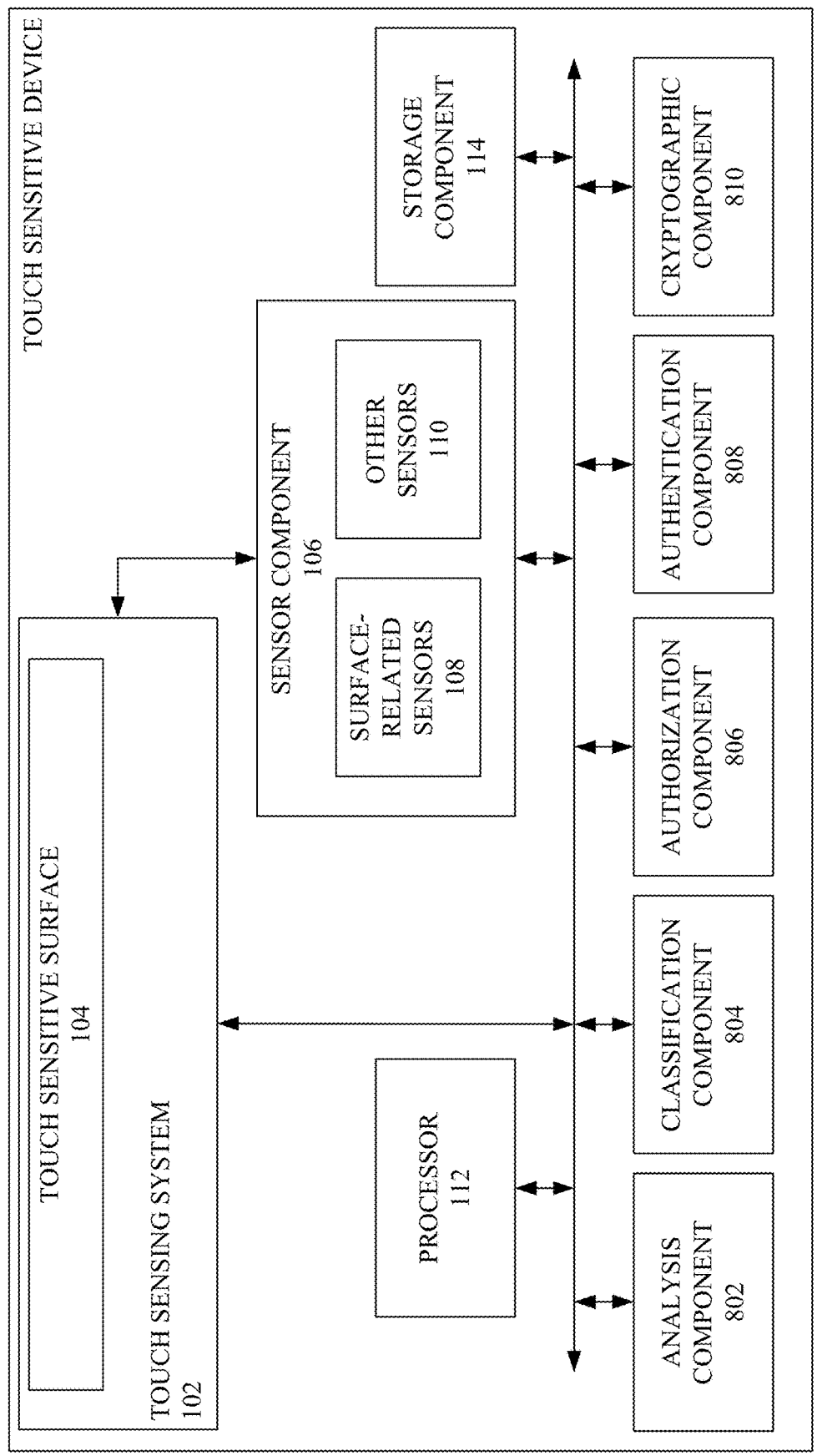
FIG. 8 illustrates a functional block diagram of an example touch sensitive device that can determine a classification of a touch event with regard to an object in contact or proximate contact with a touch sensitive surface of the touch sensitive device, in accordance with various aspects and embodiments of the disclosed subject matter.

FIG. 8 illustrates a functional block diagram of an example touch sensitive device 800 that can determine a classification of a touch event with regard to an object in contact or proximate contact with a touch sensitive surface 104 of the touch sensitive device 800, in accordance with various aspects and embodiments of the disclosed subject matter. Exemplary touch sensitive device 800 can comprise or be associated with the components, subcomponents, and/or portions or combinations thereof, as described above regarding FIGS. 1-7. In addition, exemplary touch sensitive device 800 (or touch sensitive device 100, etc.) can comprise or be associated with an exemplary analysis component 802, as further described herein, in a non-limiting aspect. In a non-limiting example, exemplary analysis component 802 can be configured to analyze characteristics of touch surface data associated with a touch sensitive surface (e.g., touch sensitive surface 104, etc.) associated with a system comprising touch sensitive device 800, etc.

In another non-limiting aspect, exemplary touch sensitive device 800 (or touch sensitive device 100, etc.) can further comprise or be associated with an exemplary classification component 804, as further described herein. As a non-limiting example, exemplary classification component 804 can be configured to determine a classification of a touch event for an object (such as a finger or other spoofed fingerprint data) with respect to the touch sensitive surface (e.g., touch sensitive surface 104, etc.), wherein the classification of the touch event is a fingerprint (e.g., touch surface data having characteristics of, relating to, associated with, similar to, or analogous to a fingerprint generated by human skin in direct contact with a touch screen). In addition, exemplary classification component 804 can be further configured to compare the data associated with the touch sensitive surface 104 to stored data (e.g., a library of fingerprint data and/or characteristics, a library of spoofed fingerprint data and/or characteristics, data stored via storage component 112, etc.) associated with at least the authorized fingerprint, wherein the stored data comprises a model of the authorized fingerprint and the unauthorized fingerprint comprising the touch surface data associated with a set of spoofed fingerprint attempts, wherein the model can be developed according to a machine learning algorithm, for example, as further described herein.

In yet another non-limiting aspect, exemplary touch sensitive device 800 (or touch sensitive device 100, etc.) can further comprise or be associated with an exemplary authorization component 806, as further described herein. In a non-limiting example, exemplary authorization component 806 can be configured to determine whether to reject the fingerprint or process the fingerprint based on the classification, wherein it is determined that the touch event is to be rejected in response to the classification being determined (e.g., via exemplary classification component 804, etc.) to be an unauthorized fingerprint comprising touch surface data associated with a spoofed fingerprint attempt, and wherein it is determined that the touch event is to be processed in response to the classification being determined (e.g., via exemplary classification component 804, etc.) to be an authorized fingerprint (e.g., a fingerprint generated by human skin in direct contact with a touch screen). In other non-limiting aspects, exemplary authorization component 806 can be further configured to one or more or process the touch event as the authorized fingerprint, determine whether to attempt to authenticate a user associated with the authorized fingerprint, by comparing the authorized fingerprint to data associated with an authenticated user comprising at least one fingerprint previously provided by the authenticated user, or whether to attempt to provide a further authentication challenge to the user, and configured to determine whether the authorized fingerprint constitutes an unauthorized access of the device by the user, based at least in part on processing the touch event as the authorized fingerprint.

In still other non-limiting aspects, exemplary authorization component 806 can be further configured to determine that the authorized fingerprint constitutes the unauthorized access of the device by the user based on comparing the authorized fingerprint to data (e.g., data stored via storage component 112, etc.) associated with an authenticated user (e.g., a valid and authorized user for which the user has satisfied a user authentication scheme). In another non-limiting aspect, exemplary authorization component 806 can be further configured to lock the touch sensitive device 800 based on the determining that the authorized fingerprint constitutes the unauthorized access of the touch sensitive device 800. In addition, exemplary authorization component 806 can be further configured to reject the touch event based on the classification being determined to be the unauthorized fingerprint comprising the touch surface data associated with the spoofed fingerprint attempt, and/or can be further configured to lock the touch sensitive device 800 in response to rejecting the touch event.

In addition, exemplary touch sensitive device 800 (or touch sensitive device 100, etc.) can comprise or be associated with an exemplary authentication component 808, as further described herein, in a non-limiting aspect. As a non-limiting example, exemplary authentication component 808 can be configured to authenticate the user, based on the classification being determined (e.g., via exemplary classification component 804, etc.) to be an authorized fingerprint (e.g., a fingerprint generated by human skin in direct contact with a touch screen) and/or comparing (e.g., via exemplary classification component 804, via exemplary authentication component 808, portions, and/or combinations thereof, etc.) the authorized fingerprint (e.g., a fingerprint generated by human skin in direct contact with a touch screen) to data (e.g., data stored via storage component 112, etc.) associated with the authenticated user (e.g., a valid and authorized user for which the user has satisfied a user authentication scheme). In still other non-limiting aspects, exemplary authentication component 808 can be further configured to provide the further authentication challenge to the user based on a comparison of the data associated with the touch sensitive surface 104 and one or more other sensor associated with the touch sensitive device 800 with the data associated with the authenticated user stored on associated with or the touch sensitive device. Accordingly, exemplary authentication component 808 can be further configured to authenticate the user, based on a determination that the further authentication challenge can be satisfied, in still further non-limiting aspects. Non-limiting examples of further authentication challenges can include, but are not limited to, authentication schemes requiring, personal ID numbers (PINs), passwords, passphrases, other biometric data (e.g., fingerprints, voice recognition, facial recognition, retinal scans, etc.), card keys, digital certificates, and so on.

In an exemplary implementation, touch sensitive device 800, or portions thereof, comprising or associated with authentication component 808, can be further configured to solicit authentication data from a user or other device (e.g., via an operating system, and/or application software, etc.) on behalf of the user, and, upon receiving authentication data so solicited, can be employed, individually and/or in conjunction with information acquired and ascertained as a result of biometric modalities employed (e.g., fingerprint recognition, facial recognition, voice recognition, etc.), to facilitate authenticating user to touch sensitive device 800, or a computer, device such as a touch sensitive surface 104, on behalf of a user, verifying received authentication data, providing further authentication challenges, and so on.

In addition to touch surface data associated with a touch sensitive surface 104 that is associated with a touch sensitive device 800, as further described herein, authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example.

Additionally and/or alternatively, public key infrastructure (PKI) data can also be employed by exemplary authentication component 808. PKI arrangements can provide for trusted third parties to vet, and affirm, entity identity through the use of public keys that typically can be certificates issued by trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

Accordingly, in addition to the fingerprint recognition, user authentication processes described herein, exemplary authentication component 808 can implement one or more machine-implemented techniques to identify a user or other device (e.g., via an operating system and/or application software), or portions thereof such as one or more other sensors 110, etc. on behalf of the user, by the user's unique physical and behavioral characteristics and attributes. Biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, voice recognition, and/or finger print identification, such as described above, that scans the corrugated ridges of skin that are non-continuous and form a pattern that can provide distinguishing features to identify an entity. Moreover, any of the components described herein (e.g., exemplary authentication component 808, and so on, etc.) can be configured to perform the described functionality (e.g., via computer-executable instructions stored in a tangible computer readable medium, and/or executed by a computer, a processor, etc.), as further described herein.

In addition, various non-limiting embodiments, have been described herein as employing stored data that comprises a model of the authorized fingerprint and the unauthorized fingerprint comprising the touch surface data associated with a set of spoofed fingerprint attempts, wherein the model is developed according to a machine learning algorithm. In other non-limiting embodiments, have been described herein as employing further authentication challenges provided to the user based on a comparison of the data associated with the touch sensitive surface and at least one other sensor associated with the touch sensitive device with the data associated with the authenticated user stored on the device.

To these and related ends, as used herein, the terms, "decision-making systems," "algorithmic decision-making systems," "algorithmic systems," "learning system," "machine learning system," "classifier," "classifier systems," "classification component," and so on can be used interchangeably, depending on context, and can refer to and to one or more computer implemented, automated or semi-automated, decision-making processes or components, according to various non-limiting implementations, as described herein. As further used herein, the terms, "data," "inputs," "features," and so on can be used interchangeably, depending on context, and can refer to data, information, and so on, used as inputs to one or more computer implemented, automated or semi-automated, decision-making processes or components, whereas the terms, "outputs," "decisions," "classifications," "outcomes," and so on can be used interchangeably, depending on context, and can refer to data, information, and so on resulting from one or more computer implemented, automated or semi-automated, decision-making processes or components based on the inputs, etc.

In still other non-limiting embodiments of exemplary touch sensitive device 800, one or more of analysis component 802, classification component 804, and so on, in conjunction with, in lieu of, in addition to, and/or complementary to one or more of the other components of exemplary touch sensitive device 800 can employ techniques and technologies appropriate for the storage, indexing, cross-referencing, searching, analysis, and so on, of large and/or complex data sets, colloquially referred to as "big data" technology. For instance, suitable technologies that can be employed by analysis component 802, classification component 804, and so on, in conjunction with, in lieu of, in addition to, and/or complementary to one or more of the other components of exemplary touch sensitive device 800 can include, without limitation, simulation, time series analysis and visualization, crowd sourcing, machine learning, natural language processing, neural networks, pattern recognition, predictive modeling, regression, signal processing, massively parallel-processing (MPP) databases, search-based applications, data-mining grids, supervised and unsupervised learning, distributed file systems, distributed databases, cloud computing platforms, and scalable storage systems, and so on, etc. to facilitate the various techniques described herein.

As a non-limiting example, one or more of analysis component 802, classification component 804, authorization fun 806, authentication component 808, and so on can employ machine learning techniques such as support vector machine classifier, which has been trained on previously recorded data (such as previously recognized human fingerprints from an authenticated user, in various contexts and environments, etc. Other classifiers which may be possible, can include but are not limited to decision trees, naive Bayes, and neural networks.

Accordingly, various non-limiting aspects as described herein, can employ machine learning or other artificial intelligence (AI), "intelligent agents," and so on, whether employed locally or facilitated over a network of interconnected devices, including touch sensitive device 800, to facilitate touch sensitive device 800, and/or components thereof, perceiving its environment (e.g., fingerprints, other authentication data, other data associated with other sensors 110, etc.), and to facilitate touch sensitive device 800, and/or components thereof, to take actions in accordance with the techniques described herein.

In addition, various non-limiting aspects as described herein, can employ sensor fusion to combine multiple sets of sensor data or data derived from sensor data or other disparate sources, whether employed serially in a decision algorithm or in parallel to arrive at an outcome, whether obtained locally or obtained over a network of interconnected devices, including touch sensitive device 800, to facilitate touch sensitive device 800, and/or components thereof, minimizing the uncertainty in determinations, classifications, analyses, and so on as described herein, than would be possible when the disparate sources are employed individually.

In other non-limiting implementations, exemplary touch sensitive device 800, or portions thereof, can comprise or be associated with cryptographic component 810 that can facilitate encrypting and/or decrypting data and/or information associated with exemplary touch sensitive device 800 to protect such sensitive data and/or information associated with an authenticated user, such as authentication data, data and/or information employed to confirm a valid identity of an authenticated user, and so on, etc. Thus, one or more processors 112 (e.g. host processor, application processor, etc.) can be associated with cryptographic component 810. In accordance with a non-limiting aspect of the disclosed subject matter, cryptographic component 810 can provide symmetric cryptographic tools and accelerators (e.g., Twofish, Blowfish, AES, TDES, IDEA, CASTS, RC4, etc.) to facilitate encrypting and/or decrypting data and/or information associated with exemplary touch sensitive device 800.

Thus, cryptographic component 810 can facilitate securing data and/or information being written to, stored in, and/or read from the storage component 114 (e.g., data associated with an authenticated user, etc.), transmitted to and/or received from a connected network (e.g., such as for transmitting information concerning an authenticated user, information concerning a user subject to a further authentication challenge, and/or associated device information to a trusted intermediary, etc.), and/or creating a secure communication channel as part of a secure association of various devices or portions thereof associated with exemplary implementations of exemplary touch sensitive device 800, or portions thereof, with an authenticated user (or one or more third parties or networks, such as AI, machine learning, and so on service providers, etc.) facilitating various aspects of the disclosed subject matter to ensure that secured data can only be accessed by those users and/or entities authorized and/or authenticated to do so. To the same ends, cryptographic component 810 can also provide asymmetric cryptographic accelerators and tools (e.g., RSA, Digital Signature Standard (DSS), and the like) in addition to accelerators and tools (e.g., Secure Hash Algorithm (SHA) and its variants such as, for example, SHA-0, SHA-1, SHA-224, SHA-256, SHA-384, SHA-512, SHA-3, and so on). As described, any of the components described herein (e.g., cryptographic component 810, and so on, etc.) can be configured to perform the described functionality (e.g., via computer-executable instructions stored in a tangible computer readable medium, and/or executed by a computer, a processor, etc.).

Figure 9:
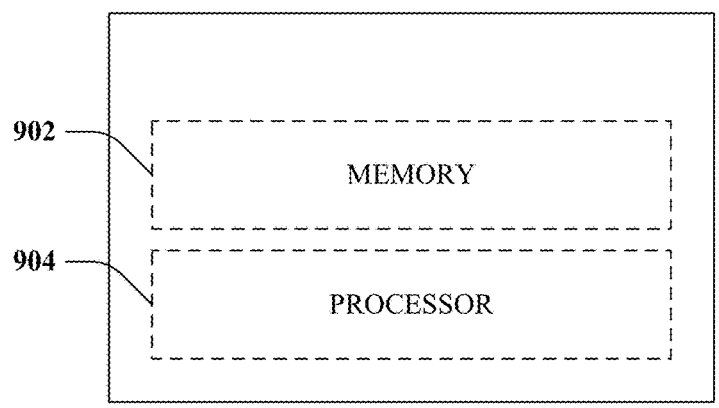
FIG. 9 illustrates an exemplary flow diagram of methods directed to fingerprint recognition on an exemplary touch sensitive device, according non-limiting aspects of embodiments of the disclosed subject matter.

FIG. 9 depicts an exemplary non-limiting device or system suitable for performing various aspects of the disclosed subject matter. For example, FIG. 9 depicts an exemplary non-limiting device or system 900 suitable for performing various aspects of the disclosed subject matter. The device or system 900 can be a stand-alone device or a portion thereof, a specially programmed computing device or a portion thereof (e.g., a memory retaining instructions for performing the techniques as described herein coupled to a processor), and/or a composite device or system comprising one or more cooperating components distributed among several devices, as further described herein. As an example, exemplary non-limiting device or system 900 can comprise exemplary devices and/or systems described above regarding FIGS. 1-8, or as further described below regarding FIGS. 9-13, or portions or combinations thereof.

Accordingly, device or system 900 can include a memory 902 that retains various instructions with respect to facilitating various operations, for example, such as: analyzing (e.g., via exemplary analysis component 802, etc.), by a system comprising a processor (e.g., processor 904, one or more processors 112, etc.), characteristics of touch surface data associated with a touch sensitive surface 104 that is associated with a device (e.g., touch sensitive device 800, etc.); based on a result of the analyzing (e.g., via exemplary analysis component 802, etc.), determining (e.g., via exemplary classification component 804, etc.), by the system, a classification of a touch event for an object with respect to the touch sensitive surface 104, wherein the classification of the touch event is a fingerprint; determining (e.g., via exemplary authorization component 806, etc.), by the system, whether to reject the fingerprint or process the fingerprint based on the classification, wherein it is determined that the touch event is to be rejected in response to the classification being determined to be an unauthorized fingerprint comprising touch surface data associated with a spoofed fingerprint attempt, and wherein it is determined that the touch event is to be processed in response to the classification being determined to be an authorized fingerprint; and so on, as further described herein, regarding FIGS. 1-8 and 9-13.

In other non-limiting implementations, device or system 9 can include a memory 902 that retains various instructions with respect to facilitating various operations, for example, such as: determining (e.g., via exemplary authorization component 806, etc.), by the system, whether to attempt to authenticate a user associated with the authorized fingerprint, by comparing (e.g., via exemplary authorization component 806, via exemplary authentication component 808, or portions or combinations thereof, etc.) the authorized fingerprint to data associated with an authenticated user comprising at least one fingerprint previously provided by the authenticated user, whether to attempt to provide a further authentication challenge to the user, or whether to determine that the authorized fingerprint constitutes an unauthorized access of the device (e.g., touch sensitive device 800, etc.) by the user, based on the processing; and so on, as further described herein, regarding FIGS. 1-8 and 9-13.

In still other non-limiting implementations, device or system 900 can include a memory 902 that retains various instructions with respect to facilitating various operations, for example, such as: authenticating (e.g., via exemplary authentication component 808, etc.), by the system, the user, based on the classification being determined to be an authorized fingerprint and the comparing the authorized fingerprint to the data associated with the authenticated user; providing (e.g., via exemplary authentication component 808, etc.), by the system, the further authentication challenge to the user based on a comparison of the data associated with the touch sensitive surface 104 and at least one other sensor associated with the touch sensitive device (e.g., touch sensitive device 800, etc.) with the data associated with the authenticated user stored on the device (e.g., touch sensitive device 800, etc.); authenticating (e.g., via exemplary authentication component 808, etc.), by the system, the user, based on a determination that the further authentication challenge is satisfied; and so on, as further described herein, regarding FIGS. 1-8 and 9-13.

In other non-limiting implementations, device or system 900 can include a memory 902 that retains various instructions with respect to facilitating various operations, for example, such as: determining (e.g., via exemplary authorization component 806, etc.), by the system, that the authorized fingerprint constitutes the unauthorized access of the device (e.g., touch sensitive device 800, etc.) by the user based on the comparing the authorized fingerprint to the data associated with the authenticated user; locking (e.g., via exemplary authorization component 806, etc.), by the system, the device (e.g., touch sensitive device 800, etc.) based on the determining that the authorized fingerprint constitutes the unauthorized access of the device (e.g., touch sensitive device 800, etc.); rejecting (e.g., via exemplary authorization component 806, etc.), by the system, the touch event based on the classification being determined to be the unauthorized fingerprint comprising the touch surface data associated with the spoofed fingerprint attempt; locking (e.g., via exemplary authorization component 806, etc.) the device (e.g., touch sensitive device 800, etc.) in response to rejecting the touch event; and so on, as further described herein, regarding FIGS. 1-8 and 9-13.

In still further non-limiting implementations, device or system 900 can include a memory 902 that retains various instructions with respect to facilitating various operations, for example, such as: determining (e.g., via exemplary classification component 804, etc.) the classification comprises comparing, by the system, the data associated with the touch sensitive surface 104 to stored data associated with at least the authorized fingerprint, wherein the stored data comprises a model of the authorized fingerprint and the unauthorized fingerprint comprising the touch surface data associated with a set of spoofed fingerprint attempts, wherein the model is developed according to a machine learning algorithm; and so on, as further described herein, regarding FIGS. 1-8 and 9-13.

The above example instructions and other suitable instructions for functionalities as described herein for example, regarding FIGS. 1-9, etc., can be retained within memory 902 (e.g., machine-readable storage medium, storage component 114, etc.), and a processor 904 (e.g., one or more processors 112, etc.) can be utilized such that, executable instructions as described herein, when executed by a processor 904 (e.g., one or more processors 112, etc.), facilitate performance of operations associated with executing the instructions.

Figure 10:
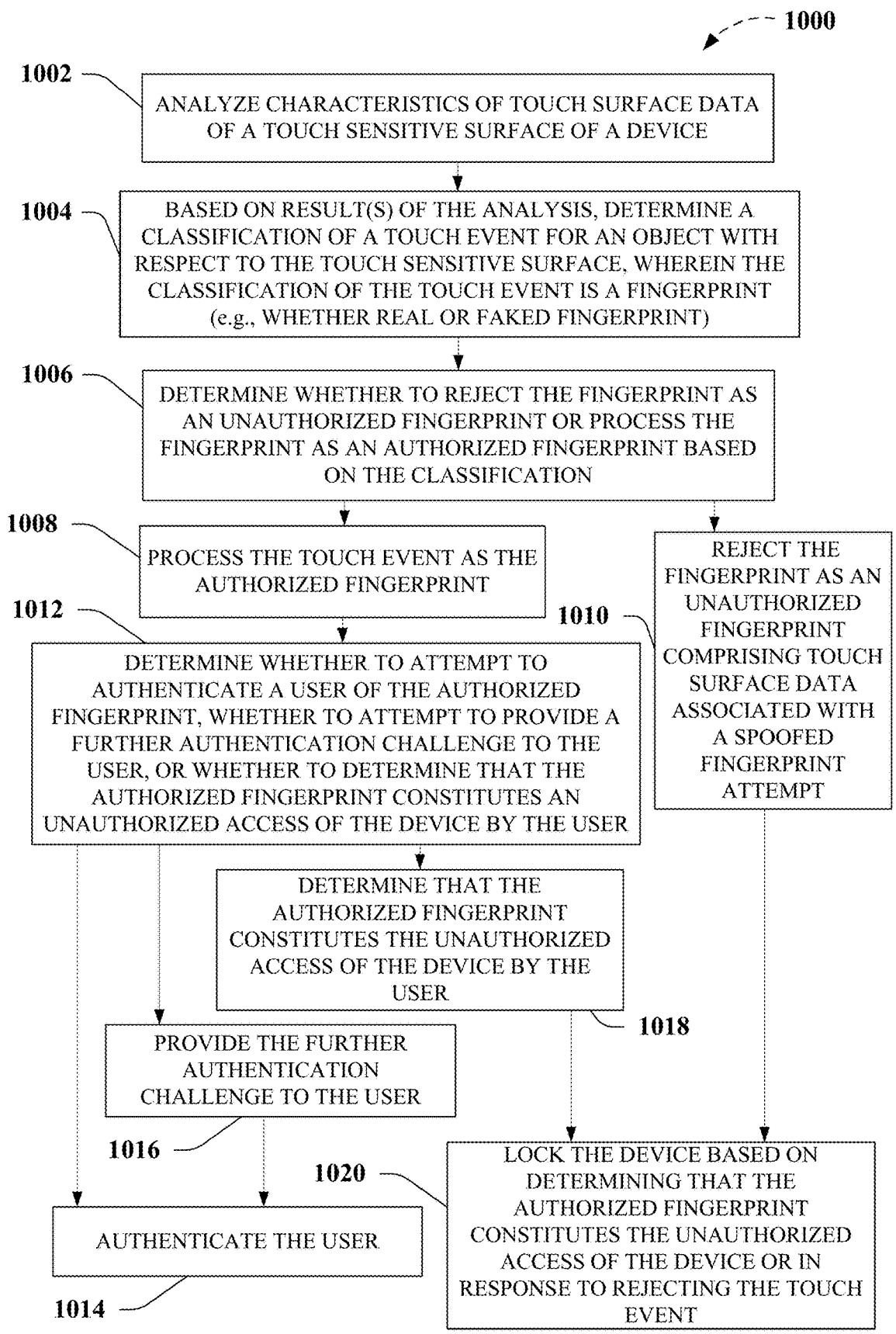
FIG. 10 depicts an exemplary non-limiting device or system suitable for performing various aspects of the disclosed subject matter.

In view of the exemplary embodiments described supra, methods that can be implemented in accordance with the disclosed subject matter will be better appreciated with reference to the flowchart of FIG. 10. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be understood that various other branches, flow paths, and orders of the blocks, can be implemented which achieve the same or a similar result. Moreover, not all illustrated blocks may be required to implement the methods described hereinafter. Additionally, it should be further understood that the methods and/or functionality disclosed hereinafter and throughout this specification are capable of being stored on an article of manufacture to facilitate transporting and transferring such methods to computers, for example, as further described herein. The terms computer readable medium, article of manufacture, and the like, as used herein, are intended to encompass a computer program accessible from any computer-readable device or media.

Exemplary Methods

FIG. 10 illustrates an exemplary non-limiting flow diagram of methods 1000 for performing aspects of embodiments of the disclosed subject matter. For instance, referring to FIG. 10, methods 1000 can facilitate fingerprint recognition user authentication processes, rejecting spoofed fingerprint attempts, preventing identity theft, and so on, as described herein. As a non-limiting example, exemplary methods 1000 can comprise, at 1002, analyzing (e.g., via exemplary analysis component 802, etc.), by a system comprising a processor (e.g., processor 904, one or more processors 112, etc.), characteristics of touch surface data associated with a touch sensitive surface 104 that is associated with a device (e.g., touch sensitive device 800, etc.), as further described herein.

In a further non-limiting example, exemplary methods 1000 can comprise, at 1004, based on a result of the analyzing (e.g., via exemplary analysis component 802, etc.), determining (e.g., via exemplary classification component 804, etc.), by the system, a classification of a touch event for an object with respect to the touch sensitive surface 104, wherein the classification of the touch event is a fingerprint, as described herein. In another non-limiting aspect, exemplary methods 1000 can further comprise, at 1004, determining (e.g., via exemplary classification component 804, etc.) the classification comprises comparing (e.g., via exemplary authorization component 806, via exemplary authentication component 808, etc.), by the system, the data associated with the touch sensitive surface 104 to stored data associated with at least the authorized fingerprint, wherein the stored data comprises a model of the authorized fingerprint and the unauthorized fingerprint comprising the touch surface data associated with a set of spoofed fingerprint attempts, wherein the model is developed according to a machine learning algorithm, as further described herein.

In yet another non-limiting example, exemplary methods 1000 can comprise, at 1006, determining (e.g., via exemplary authorization component 806, etc.), by the system, whether to reject the fingerprint or process the fingerprint based on the classification, wherein it is determined that the touch event is to be rejected in response to the classification being determined to be an unauthorized fingerprint comprising touch surface data associated with a spoofed fingerprint attempt, and wherein it is determined that the touch event is to be processed in response to the classification being determined to be an authorized fingerprint, as further described herein. In still another non-limiting example, exemplary methods 1000 can comprise, at 1008, processing, by the system, the touch event as the authorized fingerprint, as described herein.

As a further non-limiting example, exemplary methods 1000 can comprise, at 1010, rejecting (e.g., via exemplary authorization component 806, etc.), by the system, the touch event based on the classification being determined to be the unauthorized fingerprint comprising the touch surface data associated with the spoofed fingerprint attempt, as further described herein. In a non-limiting aspect, exemplary methods 1000 can further comprise, at 1020, and locking (e.g., via exemplary authorization component 806, etc.) the device (e.g., touch sensitive device 800, etc.) in response to rejecting the touch event, as further described herein.

In another non-limiting example, exemplary methods 1000 can comprise, at 1012, determining (e.g., via exemplary authorization component 806, etc.), by the system, whether to attempt to authenticate a user associated with the authorized fingerprint, by comparing (e.g., via exemplary authorization component 806, via exemplary authentication component 808, or portions or combinations thereof, etc.) the authorized fingerprint to data associated with an authenticated user comprising at least one fingerprint previously provided by the authenticated user, whether to attempt to provide a further authentication challenge to the user, or whether to determine that the authorized fingerprint constitutes an unauthorized access of the device (e.g., touch sensitive device 800, etc.) by the user, based on the processing, as described herein.

As a further non-limiting example, exemplary methods 1000 can comprise, at 1014, authenticating (e.g., via exemplary authentication component 808, etc.), by the system, the user, based on the classification being determined to be an authorized fingerprint and the comparing the authorized fingerprint to the data associated with the authenticated user, as further described herein.

In yet another non-limiting example, exemplary methods 1000 can comprise, at 1016, providing (e.g., via exemplary authentication component 808, etc.), by the system, the further authentication challenge to the user based on a comparison of the data associated with the touch sensitive surface 104 and at least one other sensor associated with the touch sensitive device (e.g., touch sensitive device 800, etc.) with the data associated with the authenticated user stored on the device (e.g., touch sensitive device 800, etc.), as further described herein. In a non-limiting aspect, exemplary methods 1000 can further comprise, at 1016, authenticating (e.g., via exemplary authentication component 808, etc.), by the system, the user, based on a determination that the further authentication challenge is satisfied at 1014.

In still a further non-limiting example, exemplary methods 1000 can comprise, at 1018, determining (e.g., via exemplary authorization component 806, etc.), by the system, that the authorized fingerprint constitutes the unauthorized access of the device (e.g., touch sensitive device 800, etc.) by the user based on the comparing the authorized fingerprint to the data associated with the authenticated user, as described herein.

As another non-limiting example, exemplary methods 1000 can comprise, at 1020, locking (e.g., via exemplary authorization component 806, etc.), by the system, the device (e.g., touch sensitive device 800, etc.) based on the determining that the authorized fingerprint constitutes the unauthorized access of the device (e.g., touch sensitive device 800, etc.), as further described herein.

As described above, exemplary methods are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be understood that various other branches, flow paths, and orders of the blocks, can be implemented which achieve the same or a similar result. Moreover, not all illustrated blocks may be required to implement the methods described hereinafter. For example, numerous variations of the disclosed devices, systems, and methods are contemplated by the disclosed subject matter. For instance, the above example embodiments are described in the context of an authorized or unauthorized user manipulating a touch sensitive device, for which spoofed fingerprint attempts (e.g., a faked fingerprint, touch surface data associated with a touch sensitive surface has the characteristics of being generated by paper or another image surface in between human skin and touch screen, which prevents direct contact of human skin with a touch screen, other spoofed fingerprint data or objects, etc.) are to be identified and rejected.

As a further non-limiting example, exemplary methods could be employed upon the authorized or unauthorized user attempting to unlock a locked touch sensitive device configured for fingerprint recognition authentication schemes according to the disclosed embodiments. According to described embodiments, spoofed fingerprint attempts (e.g., a faked fingerprint, touch surface data associated with a touch sensitive surface has the characteristics of being generated by paper or another image surface in between human skin and touch screen, which prevents direct contact of human skin with a touch screen, other spoofed fingerprint data or objects, etc.) can be identified and rejected, device locked, and further ancilliary actions (e.g., activating or initiating an identity theft protection scheme or service, etc.) can be implemented or initiated, etc.

However, further non-limiting embodiments can facilitate fingerprint recognition authentication schemes for any device, software service, web application, app, and/or application which uses as a basis for authentication at least in part, fingerprint data. Some examples include, but are not limited to, software services or apps that allow fingerprint recognition and authentication instead of, for example, a pin, a user ID and password, etc., electronic banking services or apps, financial payment services or apps, escrow and closing services, and so on, and/or virtually any electronic services or apps which require an electronic version of a handwritten signature or mark to authorize one or more actions taken for or on behalf of the user and for which a user is authorized to submit fingerprint data as an authenticating factor or token to express assent to an action.

As a further non-limiting example of other branches, flow paths, and orders of the blocks, which can be implemented to achieve the same or a similar result, various non-limiting embodiments can facilitate (e.g., via example touch sensitive device 800, one or more components, and/or portions or combination thereof, etc.) first authenticating a user to a touch sensitive device for device authentication purposes, and if authentication fails, the device can remain locked, any further actions such as payments, etc. are disabled, and so on). Next, upon authenticating a user to a touch sensitive device for device authentication purposes, an app or other described functionality (e.g., via example touch sensitive device 800, one or more components, and/or portions or combination thereof, etc.) can invoke further described embodiments to distinguish between the possibility that an analyzed touch event constitutes a fingerprint (e.g., a real fingerprint, a fingerprint generated by human skin in direct contact with a touch screen) and the possibility that the analyzed touch event constitutes a spoofed fingerprint attempt (e.g., a faked fingerprint, touch surface data associated with a touch sensitive surface has the characteristics of being generated by paper or another image surface in between human skin and touch screen, which prevents direct contact of human skin with a touch screen, other spoofed fingerprint data or objects, etc.). It can be understood that, although the various components and functionality employed (e.g., via example touch sensitive device 800, one or more components, and/or portions or combination thereof, etc.) can be comprised or associated with the device, which can include necessary communications components, protocols, etc., such that one or more of the components described in reference to example touch sensitive device 800, or portions or combinations thereof, can be implemented in a distributed fashion, where relevant data can be communicated over a network to invoke a software service (e.g., AI, machine learning, etc.) to accomplish the functionality described herein. In other non-limiting aspects, for a touch event generated by the latter case on a touch sensitive device, various embodiments can classify the touch event to be an unauthorized fingerprint comprising touch surface data associated with a spoofed fingerprint attempt, classify the touch event as an identity theft, and further actions can be performed as further described herein.

Exemplary Networked and Distributed Environments

One of ordinary skill in the art can appreciate that the various embodiments of the disclosed subject matter and related systems, devices, and/or methods described herein can be implemented in connection with any computer or other client or server device, which can be deployed as part of a communications system, a computer network, and/or in a distributed computing environment, and can be connected to any kind of data store. In this regard, the various embodiments described herein can be implemented in any computer system or environment having any number of memory or storage units, and any number of applications and processes occurring across any number of storage units or volumes, which may be used in connection with communication systems using the techniques, systems, and methods in accordance with the disclosed subject matter. The disclosed subject matter can apply to an environment with server computers and client computers deployed in a network environment or a distributed computing environment, having remote or local storage. The disclosed subject matter can also be applied to standalone computing devices, having programming language functionality, interpretation and execution capabilities for generating, receiving, storing, and/or transmitting information in connection with remote or local services and processes.

Distributed computing provides sharing of computer resources and services by communicative exchange among computing devices and systems. These resources and services can include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices can have applications, objects or resources that may utilize disclosed and related systems, devices, and/or methods as described for various embodiments of the subject disclosure.

Figure 11:
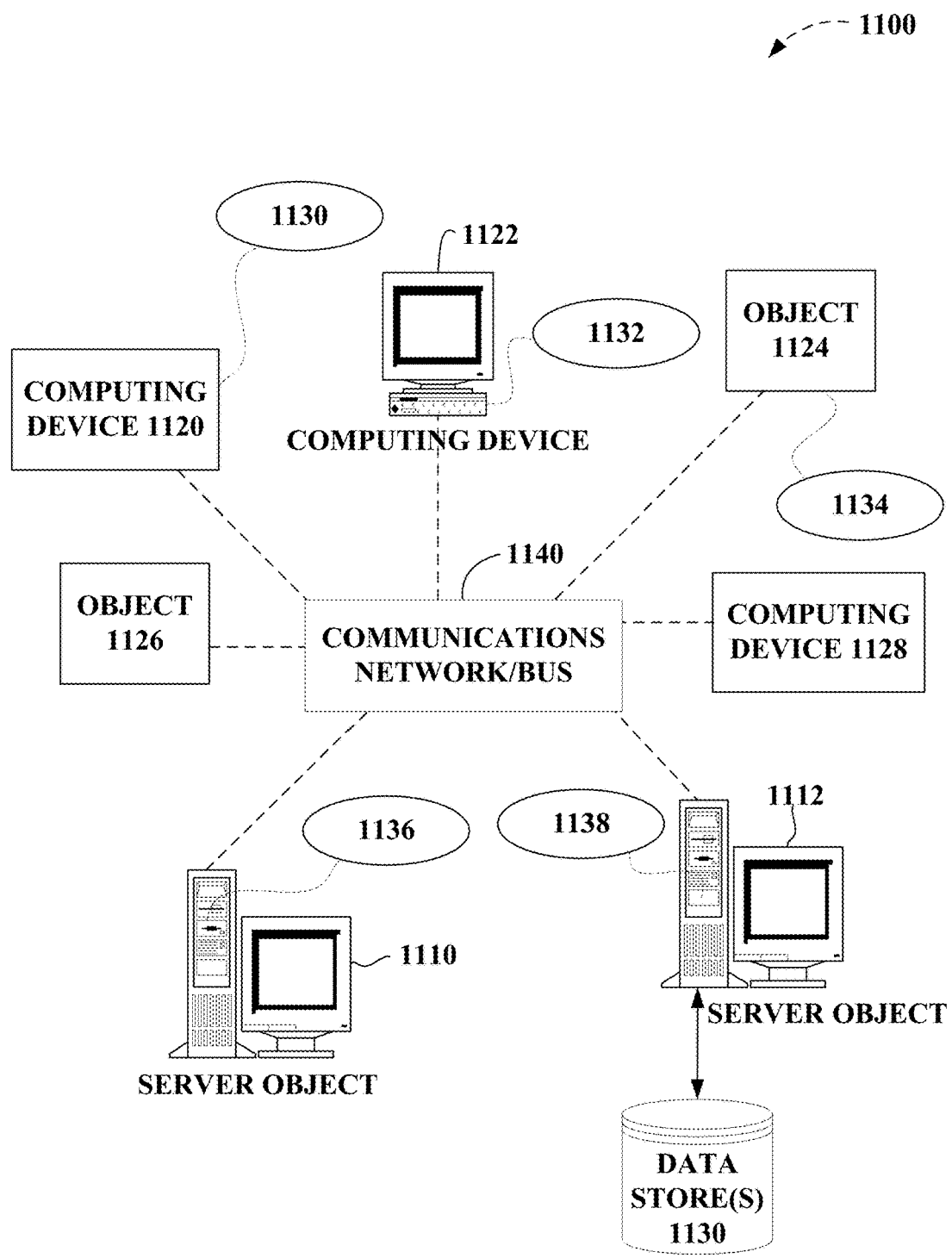
FIG. 11 is a block diagram representing exemplary non-limiting networked environments in which various embodiments described herein can be implemented.

FIG. 11 provides a schematic diagram of an exemplary networked or distributed computing environment. The distributed computing environment comprises computing objects 1110, 1112, etc. and computing objects or devices 1120, 1122, 1124, 1126, 1128, etc., which may include programs, methods, data stores, programmable logic, etc., as represented by applications 1130, 1132, 1134, 1136, 1138. It can be understood that objects 1110, 1112, etc. and computing objects or devices 1120, 1122, 1124, 1126, 1128, etc. may comprise different devices, such as PDAs, audio/video devices, mobile phones, MP3 players, personal computers, laptops, etc.

Each object 1110, 1112, etc. and computing objects or devices 1120, 1122, 1124, 1126, 1128, etc. can communicate with one or more other objects 1110, 1112, etc. and computing objects or devices 1120, 1122, 1124, 1126, 1128, etc. by way of the communications network 1140, either directly or indirectly. Even though illustrated as a single element in FIG. 11, network 1140 may comprise other computing objects and computing devices that provide services to the system of FIG. 11, and/or may represent multiple interconnected networks, which are not shown. Each object 1110, 1112, etc. or 1120, 1122, 1124, 1126, 1128, etc. can also contain an application, such as applications 1130, 1132, 1134, 1136, 1138, that can make use of an API, or other object, software, firmware and/or hardware, suitable for communication with or implementation of disclosed and related systems, devices, methods, and/or functionality provided in accordance with various embodiments of the subject disclosure. Thus, although the physical environment depicted may show the connected devices as computers, such illustration is merely exemplary and the physical environment may alternatively be depicted or described comprising various digital devices, any of which can employ a variety of wired and/or wireless services, software objects such as interfaces, COM objects, and the like.

There are a variety of systems, components, and network configurations that support distributed computing environments. For example, computing systems can be connected together by wired or wireless systems, by local networks or widely distributed networks. Currently, many networks are coupled to the Internet, which can provide an infrastructure for widely distributed computing and can encompass many different networks, though any network infrastructure can be used for exemplary communications made incident to employing disclosed and related systems, devices, and/or methods as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 11, as a non-limiting example, computers 1120, 1122, 1124, 1126, 1128, etc. can be thought of as clients and computers 1110, 1112, etc. can be thought of as servers where servers 1110, 1112, etc. provide data services, such as receiving data from client computers 1120, 1122, 1124, 1126, 1128, etc., storing of data, processing of data, transmitting data to client computers 1120, 1122, 1124, 1126, 1128, etc., although any computer can be considered a client, a server, or both, depending on the circumstances. Any of these computing devices may be processing data, forming metadata, synchronizing data or requesting services or tasks that may implicate disclosed and related systems, devices, and/or methods as described herein for one or more embodiments.

A server is typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to disclosed and related systems, devices, and/or methods can be provided standalone, or distributed across multiple computing devices or objects.

In a network environment in which the communications network/bus 1140 is the Internet, for example, the servers 1110, 1112, etc. can be Web servers with which the clients 1120, 1122, 1124, 1126, 1128, etc. communicate via any of a number of known protocols, such as the hypertext transfer protocol (HTTP). Servers 1110, 1112, etc. may also serve as clients 1120, 1122, 1124, 1126, 1128, etc., as may be characteristic of a distributed computing environment.

Exemplary Computing Device

Figure 12:
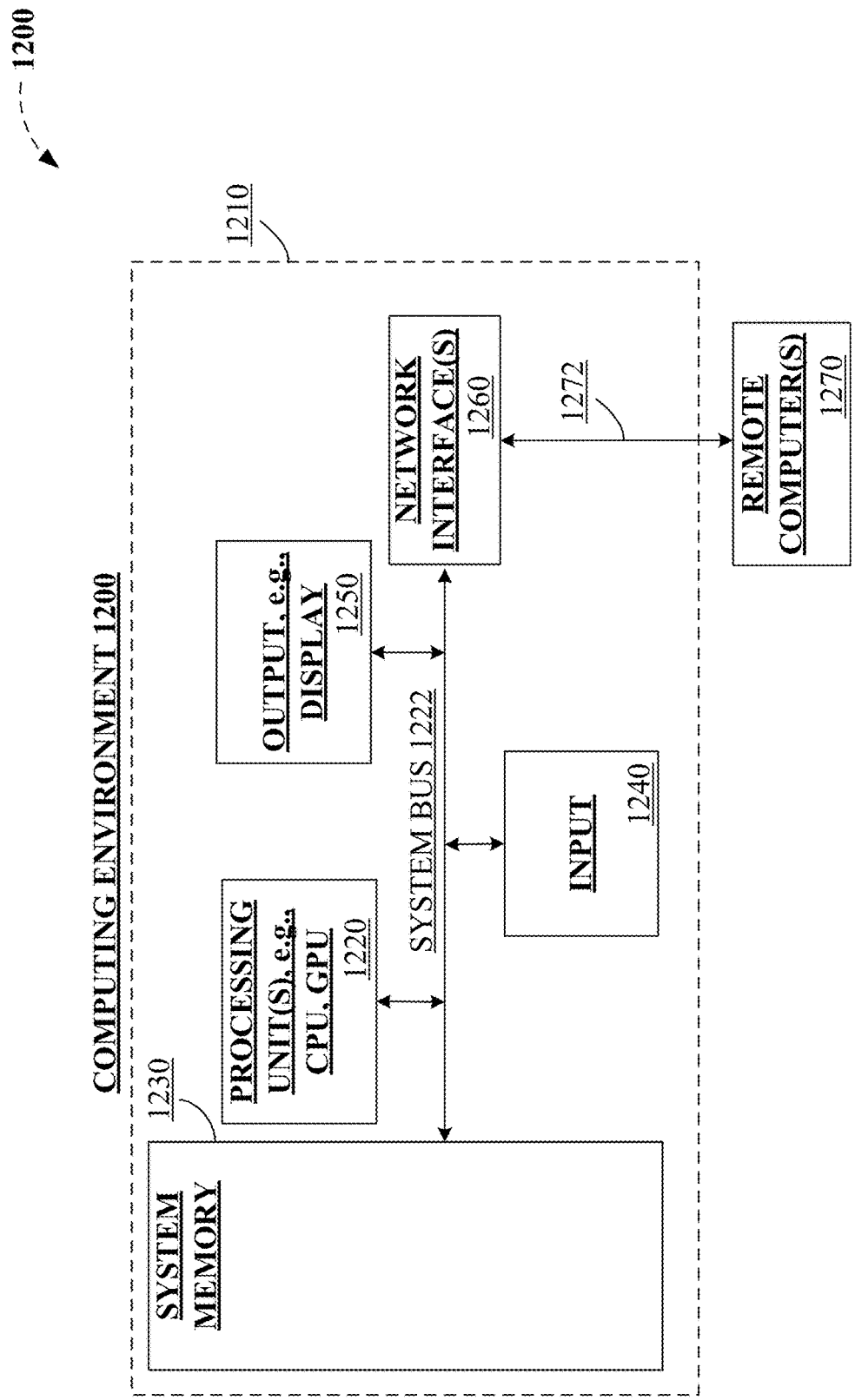
FIG. 12 is a block diagram representing an exemplary non-limiting computing system or operating environment in which one or more aspects of various embodiments described herein can be implemented.

As mentioned, advantageously, the techniques described herein can be applied to devices or systems where it is desirable to employ disclosed and related systems, devices, and/or methods. It should be understood, therefore, that handheld, portable and other computing devices and computing objects of all kinds are contemplated for use in connection with the various disclosed embodiments. Accordingly, the below general purpose remote computer described below in FIG. 12 is but one example of a computing device. Additionally, disclosed and related systems, devices, and/or methods can include one or more aspects of the below general purpose computer, such as display, storage, analysis, control, etc.

Although not required, embodiments can partly be implemented via an operating system, for use by a developer of services for a device or object, and/or included within application software that operates to perform one or more functional aspects of the various embodiments described herein. Software can be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

FIG. 12 thus illustrates an example of a suitable computing system environment 1200 in which one or aspects of the embodiments described herein can be implemented, although as made clear above, the computing system environment 1200 is only one example of a suitable computing environment and is not intended to suggest any limitation as to scope of use or functionality. Neither should the computing environment 1200 be interpreted as having any dependency or requirement relating to any one or combination of components illustrated in the exemplary operating environment 1200.

With reference to FIG. 12, an exemplary remote device for implementing one or more embodiments includes a general purpose computing device in the form of a computer 1210. Components of computer 1210 can include, but are not limited to, a processing unit 1220, a system memory 1230, and a system bus 1222 that couples various system components including the system memory to the processing unit 1220.

Computer 1210 typically includes a variety of computer readable media and can be any available media that can be accessed by computer 1210. The system memory 1230 can include computer storage media in the form of volatile and/or nonvolatile memory such as read only memory (ROM) and/or random access memory (RAM). By way of example, and not limitation, memory 1230 can also include an operating system, application programs, other program modules, and program data.

A user can enter commands and information into the computer 1210 through input devices 1240. A monitor or other type of display device is also connected to the system bus 1222 via an interface, such as output interface 1250. In addition to a monitor, computers can also include other peripheral output devices such as speakers and a printer, which can be connected through output interface 1250.

The computer 1210 can operate in a networked or distributed environment using logical connections to one or more other remote computers, such as remote computer 1270. The remote computer 1270 can be a personal computer, a server, a router, a network PC, a peer device or other common network node, or any other remote media consumption or transmission device, and can include any or all of the elements described above relative to the computer 1210. The logical connections depicted in FIG. 12 include a network 1272, such local area network (LAN) or a wide area network (WAN), but can also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts can be applied to any network system and any computing device or system in which it is Also, there are multiple ways to implement the same or similar functionality, e.g., an appropriate API, tool kit, driver code, operating system, control, standalone or downloadable software object, etc. which enables applications and services to use disclosed and related systems, devices, methods, and/or functionality. Thus, embodiments herein are contemplated from the standpoint of an API (or other software object), as well as from a software or hardware object that implements one or more aspects of disclosed and related systems, devices, and/or methods as described herein. Thus, various embodiments described herein can have aspects that are wholly in hardware, partly in hardware and partly in software, as well as in software.

Exemplary Mobile Device

Figure 13:
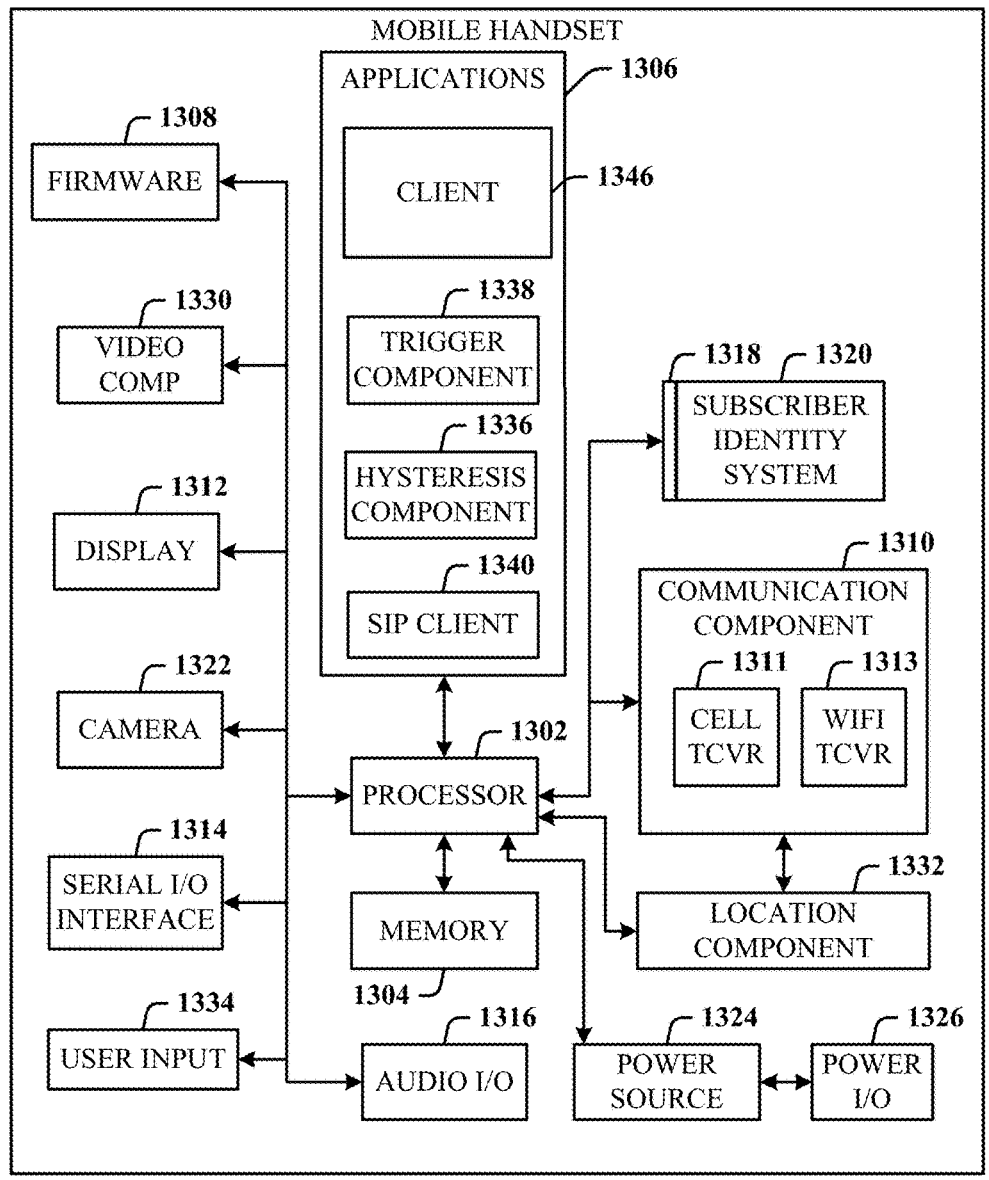
FIG. 13 illustrates a schematic diagram of an exemplary mobile device (e.g., a mobile handset) that can facilitate various non-limiting aspects of the disclosed subject matter in accordance with the embodiments described herein.

FIG. 13 depicts a schematic diagram of an exemplary mobile device 1300 (e.g., a mobile handset) that can facilitate various non-limiting aspects of the disclosed subject matter in accordance with the embodiments described herein. Although mobile handset 1300 is illustrated herein, it will be understood that other devices can be a mobile device, as described above regarding FIGS. 1-8, and that the mobile handset 1300 is merely illustrated to provide context for the embodiments of the subject matter described herein. The following discussion is intended to provide a brief, general description of an example of a suitable environment 1300 in which the various embodiments can be implemented. While the description includes a general context of computer-executable instructions embodied on a tangible computer readable storage medium, those skilled in the art will recognize that the subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer readable media. Computer readable media can comprise any available media that can be accessed by the computer and includes both volatile and non-volatile media, removable and non-removable media. By way of example and not limitation, computer readable media can comprise tangible computer readable storage and/or communication media. Tangible computer readable storage can include volatile and/or non-volatile media, removable and/or non-removable media implemented in any method or technology for storage of information, such as computer readable instructions, data structures, program modules, or other data. Tangible computer readable storage can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media, as contrasted with tangible computer readable storage, typically embodies computer readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable communications media as distinguishable from computer-readable storage media.

The handset 1300 can include a processor 1302 for controlling and processing all onboard operations and functions. A memory 1304 interfaces to the processor 1302 for storage of data and one or more applications 1306 (e.g., communications applications such as browsers, apps, etc.). Other applications can support operation of communications and/or financial communications protocols. The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1310 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wireless Fidelity (WiFi™), Worldwide Interoperability for Microwave Access (WiMax®)) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks.

The handset 1300 includes a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., Universal Serial Bus (USB), and/or Institute of Electrical and Electronics Engineers (IEEE) 1394) through a hardwire connection, and other serial input devices (e.g., a keyboard, keypad, and mouse). This supports updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process Internet Protocol (IP) data traffic through the communication component 1310 to accommodate IP traffic from an IP network such as, for example, the Internet, a corporate intranet, a home network, a person area network, etc., through an ISP or broadband cable provider. Thus, VoIP traffic can be utilized by the handset 1300 and IP-based multimedia content can be received in either an encoded or a decoded format.

A video processing component 1322 (e.g., a camera and/or associated hardware, software, etc.) can be provided for decoding encoded multimedia content. The video processing component 1322 can aid in facilitating the generation and/or sharing of video. The handset 1300 also includes a power source 1324 in the form of batteries and/or an alternating current (AC) power subsystem, which power source 1324 can interface to an external power system or charging equipment (not shown) by a power input/output (I/O) component 1326.

The handset 1300 can also include a video component 1330 for processing video content received and, for recording and transmitting video content. For example, the video component 1330 can facilitate the generation, editing and sharing of video. A location-tracking component 1332 facilitates geographically locating the handset 1300. A user input component 1334 facilitates the user inputting data and/or making selections as previously described. The user input component 1334 can also facilitate selecting perspective recipients for fund transfer, entering amounts requested to be transferred, indicating account restrictions and/or limitations, as well as composing messages and other user input tasks as required by the context. The user input component 1334 can include such conventional input device technologies such as a keypad, keyboard, mouse, stylus pen, and/or touch screen, for example.

Referring again to the applications 1306, a hysteresis component 1336 facilitates the analysis and processing of hysteresis data, which is utilized to determine when to associate with an access point. A software trigger component 1338 can be provided that facilitates triggering of the hysteresis component 1338 when a WiFi™ transceiver 1313 detects the beacon of the access point. A SIP client 1340 enables the handset 1300 to support SIP protocols and register the subscriber with the SIP registrar server. The applications 1306 can also include a communications application or client 1346 that, among other possibilities, can facilitate user interface component functionality as described above.

The handset 1300, as indicated above related to the communications component 1310, includes an indoor network radio transceiver 1313 (e.g., WiFi™ transceiver). This function supports the indoor radio link, such as IEEE 802.11, for the dual-mode Global System for Mobile Communications (GSM) handset 1300. The handset 1300 can accommodate at least satellite radio services through a handset that can combine wireless voice and digital radio chipsets into a single handheld device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into systems. That is, at least a portion of the devices and/or processes described herein can be integrated into a system via a reasonable amount of experimentation. Those having skill in the art will recognize that a typical system can include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control device (e.g., feedback for sensing position and/or velocity; control devices for moving and/or adjusting parameters). A typical system can be implemented utilizing any suitable commercially available components, such as those typically found in data computing/communication and/or network computing/communication systems.

Various embodiments of the disclosed subject matter sometimes illustrate different components contained within, or connected with, other components. It is to be understood that such depicted architectures are merely exemplary, and that, in fact, many other architectures can be implemented which achieve the same and/or equivalent functionality. In a conceptual sense, any arrangement of components to achieve the same and/or equivalent functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operatively connected," "operatively coupled," "operably connected," "operably coupled," "communicatively connected," and/or "communicatively coupled," to each other to achieve the desired functionality, and any two components capable of being so associated can also be viewed as being "operably couplable" or "communicatively couplable" to each other to achieve the desired functionality. Specific examples of operably couplable or communicatively couplable can include, but are not limited to, physically mateable and/or physically interacting components, wirelessly interactable and/or wirelessly interacting components, and/or logically interacting and/or logically interactable components.

With respect to substantially any plural and/or singular terms used herein, those having skill in the art can translate from the plural to the singular and/or from the singular to the plural as can be appropriate to the context and/or application. The various singular/plural permutations may be expressly set forth herein for the sake of clarity, without limitation.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes, but is not limited to," etc.). It will be further understood by those skilled in the art that, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limit any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those skilled in the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub-ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be noted that various embodiments of the disclosed subject matter have been described herein for purposes of illustration, and that various modifications may be made without departing from the scope and spirit of the subject disclosure. Accordingly, the various embodiments disclosed herein are not intended to be limiting, with the true scope and spirit being indicated by the appended claims.

In addition, the words "exemplary" and "non-limiting" are used herein to mean serving as an example, instance, or illustration. For the avoidance of doubt, the subject matter disclosed herein is not limited by such examples. Moreover, any aspect or design described herein as "an example," "an illustration," "exemplary" and/or "non-limiting" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements, as described above.

As mentioned, the various techniques described herein can be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on computer and the computer can be a component. In addition, one or more components can reside within a process and/or thread of execution and a component can be localized on one computer and/or distributed between two or more computers.

Systems described herein can be described with respect to interaction between several components. It can be understood that such systems and components can include those components or specified sub-components, some of the specified components or sub-components, or portions thereof, and/or additional components, and various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and that any one or more middle component layers, such as a management layer, can be provided to communicatively couple to such sub-components in order to provide integrated functionality, as mentioned. Any components described herein can also interact with one or more other components not specifically described herein but generally known by those of skill in the art.

As mentioned, in view of the exemplary systems described herein, methods that can be implemented in accordance with the described subject matter can be better appreciated with reference to the flowcharts of the various figures and vice versa. While for purposes of simplicity of explanation, the methods can be shown and described as a series of blocks, it is to be understood and appreciated that the claimed subject matter is not limited by the order of the blocks, as some blocks can occur in different orders and/or concurrently with other blocks from what is depicted and described herein. Where non-sequential, or branched, flow is illustrated via flowchart, it can be understood that various other branches, flow paths, and orders of the blocks, can be implemented which achieve the same or a similar result. Moreover, not all illustrated blocks can be required to implement the methods described hereinafter.

While the disclosed subject matter has been described in connection with the disclosed embodiments and the various figures, it is to be understood that other similar embodiments may be used or modifications and additions may be made to the described embodiments for performing the same function of the disclosed subject matter without deviating therefrom. Still further, multiple processing chips or multiple devices can share the performance of one or more functions described herein, and similarly, storage can be effected across a plurality of devices. In other instances, variations of process parameters (e.g., configuration, number of components, aggregation of components, process step timing and order, addition and/or deletion of process steps, addition of preprocessing and/or post-processing steps, etc.) can be made to further optimize the provided structures, devices and methods, as shown and described herein. In any event, the systems, structures and/or devices, as well as the associated methods described herein have many applications in various aspects of the disclosed subject matter, and so on. Accordingly, the invention should not be limited to any single embodiment, but rather should be construed in breadth, spirit and scope in accordance with the appended claims.

What is claimed is:

1. A method, comprising:

analyzing, by a system comprising a processor, characteristics of touch surface data associated with a touch sensitive surface that is associated with a touch sensitive device, wherein the analyzed characteristics of the touch surface data comprise an image having a plurality of regions corresponding to different amounts of pressure, intensity of resistance, or intensity of capacitance detected at the touch sensitive surface;

based at least in part on at least one result of the analyzing, determining, by the system, a classification of a touch event for an object with respect to the touch sensitive surface, wherein the classification of the touch event is an authorized or unauthorized fingerprint, wherein the determining of the classification comprises comparing, by the system, the data associated with the touch sensitive surface to stored data associated with at least the authorized fingerprint, wherein the stored data comprises a model of a plurality of images associated with the authorized fingerprint and the unauthorized fingerprint associated with a set of spoofed fingerprint attempts; and determining, by the system, whether to reject the fingerprint or process the fingerprint based at least in part on the classification, wherein it is determined that the touch event is to be rejected in response to the classification being determined to be an unauthorized fingerprint comprising touch surface data associated with a spoofed fingerprint attempt, and wherein it is determined that the touch event is to be processed in response to the classification being determined to be an authorized fingerprint.

2. The method of claim 1, further comprising:

processing, by the system, the touch event as the authorized fingerprint; and determining, by the system, whether to attempt to authenticate a user associated with the authorized fingerprint, by comparing the authorized fingerprint to data associated with an authenticated user comprising at least one fingerprint previously provided by the authenticated user, whether to attempt to provide a further authentication challenge to the user, or whether to determine that the authorized fingerprint constitutes an unauthorized access of the device by the user, based at least in part on the processing.

3. The method of claim 2, further comprising:

authenticating, by the system, the user, based at least in part on the classification being determined to be an authorized fingerprint and the comparing the authorized fingerprint to the data associated with the authenticated user.

4. The method of claim 3, further comprising:
providing, by the system, the further authentication challenge to the user based on a comparison of the data associated with the touch sensitive surface and at least one other sensor associated with the touch sensitive device with the data associated with the authenticated user stored on the device; and
authenticating, by the system, the user, when it is determined that the further authentication challenge is satisfied.

5. The method of claim 2, further comprising:
determining, by the system, that the authorized fingerprint constitutes the unauthorized access of the device by the user based at least in part on the comparing the authorized fingerprint to the data associated with the authenticated user; and
locking, by the system, the device when it is determined that the authorized fingerprint constitutes the unauthorized access of the device.

6. The method of claim 1, further comprising:
rejecting, by the system, the touch event based at least in part on the classification being determined to be the unauthorized fingerprint comprising the touch surface data associated with the spoofed fingerprint attempt; and
locking, by the system, the device in response to rejecting the touch event.

7. The method of claim 1, wherein the analyzed characteristics of the touch surface data further comprise data detected by an accelerometer, a gyroscope, or an ultrasonic sensor associated with the touch sensitive device.

8. A system associated with a touch sensitive device, comprising:
a memory that stores executable components; and
a processor, operatively coupled to the memory, that executes the executable components, the executable components comprising:
an analysis component configured to analyze characteristics of touch surface data associated with a touch sensitive surface that is associated with a touch sensitive device, wherein the analyzed characteristics of the touch surface data comprise an image having a plurality of regions corresponding to different amounts of pressure, intensity of resistance, or intensity of capacitance detected at the touch sensitive surface;
a classification component configured to determine, based on at least one result of the analyzing, a classification of a touch event for an object with respect to the touch sensitive surface, wherein the classification of the touch event is an authorized or unauthorized fingerprint, wherein the determining of the classification comprises comparing, by the system, the data associated with the touch sensitive surface to stored data associated with at least the authorized fingerprint, wherein the stored data comprises a model of a plurality of images associated with the authorized fingerprint and the unauthorized fingerprint associated with a set of spoofed fingerprint attempts; and
an authorization component configured to determine whether to reject the fingerprint or process the fingerprint based at least in part on the classification, wherein it is determined that the touch event is to be rejected in response to the classification being determined to be an unauthorized fingerprint comprising touch surface data associated with a spoofed fingerprint attempt, and wherein it is determined that the touch event is to be processed in response to the classification being determined to be an authorized fingerprint.

9. The system of claim 8, wherein the authorization component is further configured to process the touch event as the authorized fingerprint, configured to determine whether to attempt to authenticate a user associated with the authorized fingerprint, by comparing the authorized fingerprint to data associated with an authenticated user comprising at least one fingerprint previously provided by the authenticated user, or whether to attempt to provide a further authentication challenge to the user, and configured to determine whether the authorized fingerprint constitutes an unauthorized access of the device by the user, based at least in part on processing the touch event as the authorized fingerprint.

10. The system of claim 9, the executable components further comprising:
an authentication component configured to authenticate the user, based at least in part on the classification being determined to be an authorized fingerprint and the comparing the
authorized fingerprint to the data associated with the authenticated user.

11. The system of claim 10, wherein the authentication component is further configured to provide the further authentication challenge to the user based on a comparison of the data associated with the touch sensitive surface and at least one other sensor associated with the touch sensitive device with the data associated with the authenticated user stored on the touch sensitive device and to authenticate the user, based on a determination that the further authentication challenge is satisfied.

12. The system of claim 10, wherein the authorization component is further configured to determine that the authorized fingerprint constitutes the unauthorized access of the device by the user based at least in part on the comparing the authorized fingerprint to the data associated with an authenticated user and to lock the device based on the determining that the authorized fingerprint constitutes the unauthorized access of the touch sensitive device.

13. The system of claim 8, wherein the authorization component is further configured to reject the touch event based at least in part on the classification being determined to be the unauthorized fingerprint comprising the touch surface data associated with the spoofed fingerprint attempt, and further configured to lock the touch sensitive device in response to rejecting the touch event.

14. The system of claim 8, wherein the analyzed characteristics of the touch surface data further comprise data detected by an accelerometer, a gyroscope, or an ultrasonic sensor associated with the touch sensitive device.

15. A non-transitory machine-readable storage medium, comprising executable instructions that, when executed by a processor, facilitate performance of operations, comprising:
analyzing, by a system comprising a processor, characteristics of touch surface data associated with a touch sensitive surface that is associated with a touch sensitive device, wherein the analyzed characteristics of the touch surface data comprise an image having a plurality of regions corresponding to different amounts of pressure, intensity of resistance, or intensity of capacitance detected at the touch sensitive surface;

based at least in part on at least one result of the analyzing, determining, by the system, a classification of a touch event for an object with respect to the touch sensitive surface, wherein the classification of the touch event is an authorized or unauthorized fingerprint, wherein the determining of the classification comprises comparing, by the system, the data associated with the touch sensitive surface to stored data associated with at least the authorized fingerprint, wherein the stored data comprises a model of a plurality of images associated with the authorized fingerprint and the unauthorized fingerprint associated with a set of spoofed fingerprint attempts; and determining, by the system, whether to reject the fingerprint or process the fingerprint based at least in part on the classification, wherein it is determined that the touch event is to be rejected in response to the classification being determined to be an unauthorized fingerprint comprising touch surface data associated with a spoofed fingerprint attempt, and wherein it is determined that the touch event is to be processed in response to the classification being determined to be an authorized fingerprint.

16. The non-transitory machine-readable storage medium of claim 15, further comprising executable instructions that, when executed by the processor, facilitate performance of operations, comprising:

processing, by the system, the touch event as the authorized fingerprint; and determining, by the system, whether to attempt to authenticate a user associated with the authorized fingerprint, by comparing the authorized fingerprint to data associated with an authenticated user comprising at least one fingerprint previously provided by the authenticated user, whether to attempt to provide a further authentication challenge to the user, or whether to determine that the authorized fingerprint constitutes an unauthorized access of the device by the user, based at least in part on the processing.

17. The non-transitory machine-readable storage medium of claim 16, further comprising executable instructions that, when executed by the processor, facilitate performance of operations, comprising:

authenticating, by the system, the user, based at least in part on the classification being determined to be an authorized fingerprint and the comparing the authorized fingerprint to the data associated with the authenticated user.

18. The non-transitory machine-readable storage medium of claim 16, further comprising executable instructions that, when executed by the processor, facilitate performance of operations, comprising:

providing, by the system, the further authentication challenge to the user based on a comparison of the data associated with the touch sensitive surface and at least one other sensor associated with the touch sensitive device with the data associated with the authenticated user stored on the device.

19. The non-transitory machine-readable storage medium of claim 18, further comprising executable instructions that, when executed by the processor, facilitate performance of operations, comprising:

authenticating, by the system, the user, based on a determination that the further authentication challenge is satisfied.

20. The non-transitory machine-readable storage medium of claim 16, further comprising executable instructions that, when executed by the processor, facilitate performance of operations, comprising:

determining, by the system, that the authorized fingerprint constitutes the unauthorized access of the device by the user based at least in part on the comparing the authorized fingerprint to the data associated with the authenticated user.

21. The non-transitory machine-readable storage medium of claim 20, further comprising executable instructions that, when executed by the processor, facilitate performance of operations, comprising:

locking, by the system, the device based on the determining that the authorized fingerprint constitutes the unauthorized access of the device.

22. The non-transitory machine-readable storage medium of claim 15, further comprising executable instructions that, when executed by the processor, facilitate performance of operations, comprising:

rejecting, by the system, the touch event based at least in part on the classification being determined to be the unauthorized fingerprint comprising the touch surface data associated with the spoofed fingerprint attempt; and locking the device in response to rejecting the touch event.

23. The non-transitory machine-readable storage medium of claim 15, wherein the analyzed characteristics of the touch surface data further comprise data detected by an accelerometer, a gyroscope, or an ultrasonic sensor associated with the touch sensitive device.

* * * * *